(12) United States Patent
Chu et al.

(10) Patent No.: US 7,108,887 B2
(45) Date of Patent: *Sep. 19, 2006

(54) JUICE PROCESSING INCORPORATING RESIN TREATMENT

(75) Inventors: Osvaldo A. Chu, Sarasota, FL (US);
Yongsoo Chung, Bradenton, FL (US);
Mark A. Pepper, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 281 days.

This patent is subject to a terminal disclaimer.

(21) Appl. No.: 10/234,611

(22) Filed: Sep. 4, 2002

(65) Prior Publication Data

US 2003/0064144 A1    Apr. 3, 2003

Related U.S. Application Data

(63) Continuation-in-part of application No. 09/556,577, filed on Apr. 24, 2000, now Pat. No. 6,544,577, which is a continuation-in-part of application No. 09/209,161, filed on Dec. 10, 1998, now Pat. No. 6,054,168.

(51) Int. Cl.
*A23L 2/02* (2006.01)
*A23L 2/06* (2006.01)

(52) U.S. Cl. .................... 426/599; 426/271; 426/489; 426/616

(58) Field of Classification Search ................ 426/599, 426/271, 616, 489
See application file for complete search history.

(56) References Cited

U.S. PATENT DOCUMENTS

| | | | |
|---|---|---|---|
| 4,297,220 A | 10/1981 | Meitzner et al. | |
| 4,439,458 A | 3/1984 | Puri | |
| 4,514,427 A | 4/1985 | Mitchell et al. | |
| 4,965,083 A | 10/1990 | Norman et al. | |
| 5,734,046 A | 3/1998 | Ifuku et al. | |
| 5,817,354 A | 10/1998 | Mozaffar et al. | |
| 5,885,638 A | 3/1999 | Takayanagi | |
| 6,045,842 A | 4/2000 | Mozaffar et al. | |
| 6,054,168 A * | 4/2000 | Lioutas et al. | 426/599 |
| 6,534,107 B1 | 3/2003 | Ma et al. | |

FOREIGN PATENT DOCUMENTS

| | | | |
|---|---|---|---|
| JP | 407241181 A * | 9/1995 | |
| WO | WO 01/87092 | 11/2001 | |
| WO | WO 01/87097 | 11/2001 | |

OTHER PUBLICATIONS

Johnson and Chandler, "Ion Exchange and Absorbent Resins for Removal of Acids and Bitter Principles from Citrus Juices", *J. Sci. Food Agric.* 1985, 36, 480-484.

Johnson and Chandler. "Adsorptive Removal of Bitter Principles and Titratable Acid from Citrus Juices", *Food Technology*, May 1988.

(Continued)

*Primary Examiner*—Helen Pratt
(74) *Attorney, Agent, or Firm*—Goodwin Procter LLP; Lars Johnson; Carolyn Sloane

(57) ABSTRACT

Juices are processed to remove naturally occurring components which detract from the quality of the fruit juice. Such components are removed by contacting the juice with an adsorptive rein in order to provide an enhanced fruit juice supply. Preferred juices are citrus juices.

55 Claims, 2 Drawing Sheets

OTHER PUBLICATIONS

Kimball and Norman, "Processing Effects during Commercial Debittering of California Navel Orange Juice", *J. Agric. Food Chem.* 1990, 38, 1396-1400.

Manlan, et al., "Evaluation of the Properties of Polystyrene Divinylbenzene Adsorbents for Debittering Grapefruit Juice", *Journal of Food Science*—vol. 55, No. 2, pp. 440-445, 1990.

Norman and Kimball, "A Commercial Citrus Debittering System", *ASME* 36, pp. 1-30, 1990.

Wethern, "Citrus Debittering With Ultrafiltration/Adsorption Combined Technology", *ASME 37*, pp. 48-66, 191.

LaFlamme and Weinand, "New Developments Using the Combination of Membrane Firltration and Adsorption Technology", (German language), Journal Article ISSN: 0015-4539, *FSTA & VITIS IFIS Publishing*, 1997.

Najm, et al., "Effects of Orange Juice Fortification with Thiols on p-Vinylguaiaco Formation, Ascorbic-Acid Degradation, Browning, and Acceptance during Pasteurization and Storage under Moderate Conditions", *J. Agric. Food Chem.* 1997, 45, 1861-1867.

* cited by examiner

US 7,108,887 B2

JUICE PROCESSING INCORPORATING RESIN TREATMENT

CROSS-REFERENCE TO RELATED APPLICATION

This is a continuation-in-part of application Ser. No. 09/556,577, filed Apr. 24, 2000, now U.S. Pat. No. 6,544,577, which is a continuation-in-part of application Ser. No. 09/209,161, filed Dec. 10, 1998, now U.S. Pat. No. 6,054,168, each incorporated hereinto by reference.

FIELD OF THE INVENTION

This invention generally relates to citrus-originating products and processes for making them. More particularly, the invention separates a citrus juice source into a permeate liquid and a retentate containing a large percentage of the pulp and other solids present in the citrus juice source. This permeate is subjected to treatment with an adsorptive resin which reduces levels of less desirable components, including traditionally recognized bitterants such as naringin and limonin along with other juice components which are susceptible to adsorption by such resins and which otherwise detract from the quality of the juice products.

BACKGROUND OF THE INVENTION

Citrus fruits have long been recognized as valuable sources of important nutrients. More recently, health benefits and disease retarding or treating benefits of citrus sources have come to be more fully recognized as advantageous and beneficial when ingested. Accordingly, there is a general belief that increasing the intake of citrus-originating foods is a beneficial and important objective in the overall scheme of human health.

Segments of the population are less than enthusiastic about certain characteristics of citrus products, such as bitterness, acidity, off flavor notes, browning, and a thick consistency. Concerns about these types of characteristics are perhaps most prevalent when the citrus product or ingredient is grapefruit originating. Other citrus fruits can present these types of concerns, including orange, tangerine and lemon fruits. In terms of volume of juice and percentage of dislike in the juice-consuming population, grapefruit products, non-traditional orange-originating products, and some traditional citrus products, present both the greatest challenge and the most promising potential. Heretofore, these resources have been underutilized due to these types of characteristics, which characteristics can be considered objectionable to certain segments of the population, or can otherwise detract from juice quality.

Numerous approaches have been taken in the past which incorporate various filtration and ion exchange technology in order to operate upon citrus juice sources with a view toward preparing a variety of different products and byproducts. These approaches typically do not substantially change the characteristics of or operate on pulp components. It has long been known that citrus pulp can be separated from citrus juice. Often, this involves removing pulp so as to provide a so-called clarified juice or serum, which can be subjected to debittering. In those instances, the separated pulp is discarded, used in low-value products such as animal feed, or is stored for reintroduction of some of it into juice products which are formulated to have high pulp contents.

Removal of components from citrus with resin is generally known. Mitchell et al. U.S. Pat. No. 4,514,427 notes that bitter narigin and limonin can be removed from citrus juices by contacting the juice with a weak base anionic exchange resin having a matrix of a styrene polymer and functional groups derived from a monoamine or a polyamine. Puri U.S. Pat. No. 4,439,458 describes reducing flavonoid and/or limonoid induced bitterness in citrus fruit juices through adsorption of such bitterness componets by a resin. This patent notes that naringin is a typical flavonoid, that limonin is a typical limonoid, and that the resin can be a styrene divinylbenzene cross-linked co-polymer. Norman et al. U.S. Pat. No. 4,965,083 has a general teaching along these lines, and this patent discloses a post-crosslinked adsorbent resin.

Divinylbenzene adsorptive resins are disclosed in Meitzner et al. U.S. Pat. No. 4,297,220, in Ifuku et al. U.S. Pat. No. 5,734,046, and in Takayanagi et al. U.S. Pat. No. 5,885,638. Mozaffar et al. U.S. Pat. No. 5,817,354 specifically teaches the use of Rohm and Haas AMBERLITE® XAD-16 styrene divinylbenzene resin to adsorb, and thus remove from citrus juices, bitterness compounds such as limonoids, including limonin, nomilin and other compounds, and flavonoids such as narigin and hesperidin. In general, the art recognizes that adsorptive resins such as AMBERLITE® XAD-16 of Rohm and Haas are useful for removing flavonoids and limonoids from citrus juice sources.

The subject matter of each patent or publication mentioned herein is incorporated by reference hereinto. For example, the chemical structure of the styrene divinylbenzene resins is disclosed in the thus incorporated patented or published subject matter.

As noted generally herein, in many instances, citrus fruit is not used in a high value manner or citrus materials are not particularly palatable or suitable for commercially distributed products. For this reason and others, citrus fruits are not used to their full potential, and many valuable nutrients are not put to use in a manner which directly benefits people. This is particularly true for separated components which include citrus bitterants at naturally high levels. There is accordingly a need for approaches which allow a more complete realization of the potential of citrus fruits, and especially of citrus juices, grapefruit sources, and currently under utilized citrus sources in general which have components that create concerns regarding bitter flavor or sensory notes or regarding off-favors which develop over time or otherwise are present in the citrus source.

Fruit juices of interest include those for use in juice sources which are concentrated and which can be reconstituted before distribution to the consumer or thereafter. These so-called "from concentrate" juices undergo an evaporation or concentration procedure. The invention also is of value for processing fruit including citrus fruit into juices which are consumed without ever being concentrated or subjected to an evaporation process. The invention allows juice sources—ranging from relatively low quality peel juice to Grade A juice sources—to be improved by removal of less desirable components.

The juice products which can be improved according to the invention include filler juices as well as stand-alone juices. Many blended juice products are currently marketed. Most such products include as a primary component what has come to be known as "filler" juice. A filler juice is a relatively inexpensive juice source which is suitable for blending with other juices or juice flavors which are generally known as "key" flavors. These key flavor juices or flavorings are generally dominant to the senses, especially taste, with the result that a blended juice product can contain relatively low levels of key juice or flavor sources while still achieving the desired blended flavor of key juice(s). Primary filler juices have been apple juice and/or grape juice, particularly white grape juice. These traditional types of filler juices are generally considerably lower in nutritional content than are citrus juices. The use of citrus sources as filler juices has developed by technology such as in U.S. Pat. No. 6,054,168. Filler juices should be relatively low in cost and have a relatively bland flavor.

Accordingly, there is a need for juice sources, whether they be stand-alone juices, juices for blending or filler juices, which can themselves be improved by removing naturally present components which have negative effects on juice products as processed and/or after packaging and storage.

SUMMARY OF THE INVENTION

In accordance with the present invention, fruit sources are processed into a variety of unique products which are relatively low in bitterness attributes, and which can exhibit a clarity attribute that can be tailored according to real or perceived needs by contacting juice with adsorptive resin which extracts components from the juice. The resulting products are entirely natural. The nutrients present in the fruit source are effectively retained in the products. Typically citrus juices are chosen, and often their processing includes filtration of a citrus juice supply or concentrated citrus juice supply to minimize solids which are contacted with resin. Juice improvement results from contact of the juice product with adsorptive resins, preferably a styrene divinylbenzene resin. A most preferred example of such a resin is AMBERLITE® XAD-16 resin available from Rohm and Haas Company.

It is accordingly a general object of the present invention to provide improved fruit juice products and processes which incorporate debittering and/or removal of undesirable components and/or byproducts.

Another object of the present invention is to provide improved citrus fruit processing and products which improve the overall yield and/or utilization of citrus fruit sources.

Another object of this invention is to provide improved citrus juice products which are incorporated into food and beverage products without adding undesirable bitterness flavor or sensory notes.

Another object of the present invention is to provide citrus juice products which had been subjected to the adsorptive properties of a styrene divinylbenzene resin, and processes for preparing and using same.

Another object of the present invention is to provide a citrus juice product which had been subjected to the adsorptive properties of a styrene divinylbenzene resin such as XAD-16, and processes for preparing and using same.

These and other objects, features and advantages of the present invention will be apparent from and clearly understood through a consideration of the following detailed description.

BRIEF DESCRIPTION OF THE DRAWINGS

In the course of this description, reference will be made to the attached drawings, wherein.

DETAILED DESCRIPTION OF THE PREFERRED EMBODIMENT

The present invention is directed toward fruit products and processes, especially to citrus fruit originating products and processes for making them. Citrus fruits include grapefruit, orange, tangerine and lemon fruits. The invention is well suited for use with grapefruit and orange sources and for low value orange, grapefruit and other citrus sources, as well as for other citrus juice sources. At times, the citrus fruit which is discussed herein is grapefruit. Its traditionally recognized primary citrus bitterant is naringin, a flavonoid. The invention successfully addresses concerns regarding perceived negative attributes of juice products. The principles of this invention are applicable to citrus fruit sources in addition to grapefruit, including juice extracted from the peel and pulp fractions of citrus fruits, as well as from concentrate and not from concentrate citrus-containing juices. Such sources include orange sources. Its traditionally recognized primary bitterant is limonin, a limonoid.

Other components which are removed or reduced in quantity within citrus sources according to the invention are other limonoids such as nomolin and the like. Such components include other flavonoids such as the flavones hesperidin (typically in orange juice at 350–7000 mg/liter), hesperidin glucoside, narirutin (typically in orange juice at 18–65 mg/liter) narirutin glucoside and the like. Also included are carotenoids and polyphenolic compounds such as paravinylguaiacol (PVG). In relatively small quantities, methoxylated flavones such as noviletin, sinesetin, heptamethoxyflavone and tangeretin are present in orange juice as polyphenolic compounds which are addressed by the present invention.

Figure 1:
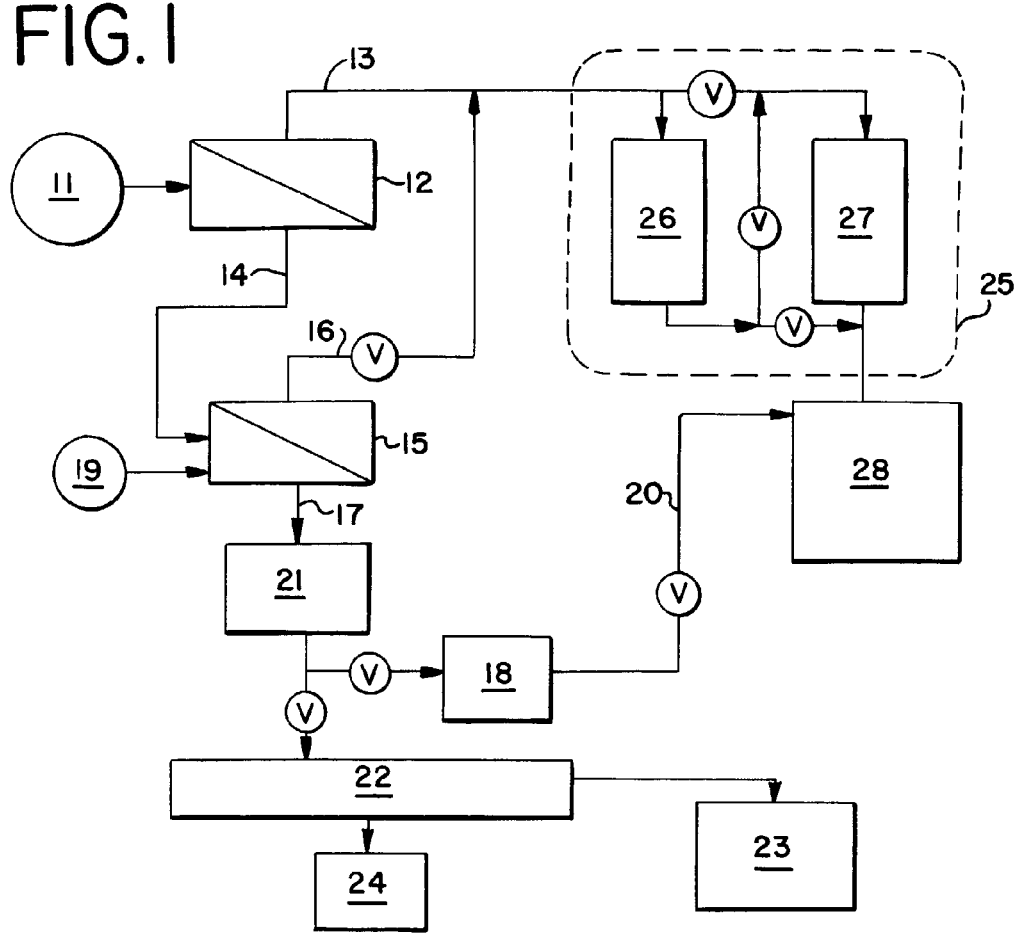
FIG. 1 is a schematic representation of an embodiment of the invention which can be used in preparing a debittered juice product or product otherwise subjected to an adsorptive resin treatment.

With reference to FIG. 1, a juice such as a citrus juice 11 is the originating material. It can be, for example, a grapefruit or orange juice, a concentrated orange or grapefruit juice, or an orange or grapefruit peel juice or a pulp wash product from orange or grapefruit processing. A typical citrus juice source would have a soluble solids or sugars level of 5–15° Brix. As is well-known in the art, such Brix levels will be considerably higher as the juice source is provided in a more concentrated condition, so that these solids or sugars correspondence levels can be as high as 60° Brix and above.

Juice 11, especially when it is a citrus juice, will have a level of natural bitterant(s) and/or off-flavor compounds which vary with the originating fruit. These generally are flavonoids, terpenes, limonoids, polymethoxylated flavones and phenolic compounds. Typical ranges are between about 500 ppm and about 1200 ppm of the flavonoid naringin for traditional grapefruit sources and about 5 ppm to about 100 ppm of the limonoid limonin for traditional orange sources. Supply 11 will also have a naturally occurring acidity level, typically primarily citric acid for citrus juices, of between about 0.70 weight percent to about 1.20 weight percent for citrus juices.

Juice source 11 flows into a separation unit 12, such as a filter or centrifuge. Typically unit 12 will be a membrane filtration unit such as one that incorporates an ultra filtration membrane and/or a micro filtration membrane. A typical ultra filtration membrane of this type will have a minimum pore size of about 30 Angstroms, which generally equates to a Molecular Weight Cut Off (MWCO) of about 2000. A typical ultra filtration membrane maximum pore size is about 1000 Angstroms (0.1 micron), which generally equates to 100,000 MWCO. A typical micro filtration membrane of this type will have a pore size range of between about 0.1 micron and about 1.0 micron.

Separation unit 12 separates the flow from the juice source 11 into a permeate which moves into a transfer member 13 and a retentate which moves into a transfer member 14. This permeate continues to have a Brix level, a bitterant level, an off-flavor level and an acidity level approximating those of the juice source 11. It is substantially devoid of any pulp or clouding solids. The retentate from separation unit 12 is a byproduct of the juice processing hereof. This retentate retains virtually all of the natural solids or pulp material. This retentate can be generally referred to as citrus pulp solids when citrus sources are used. It also has the Brix level, bitterant level and acidity level which approximate or are greater than those of the juice source 11. This retentate byproduct contains the suspended solids such as proteins and fibers and high molecular weight carbohydrates such as pectins associated with cloud.

In the system which is further illustrated to show possible optional treatment of the pulp material, a diafiltration unit 15 receives the pulp retentate from the transfer member 14. As is generally known in the art, a diafiltration unit accomplishes filtration through the use of a washing system which applies a liquid from wash source 19 to the filtration media. Such an approach allows soluble components within the pulp retentate to be dissolved so as to pass through the filtration media, while the pulp solids collect as a diafiltration retentate. In an illustrated arrangement, between approximately 75% and 90% of the soluble components find their way into the diafiltration permeate and to transfer member 16. Most of the following components find their way into the diafiltration permeate when this diafiltration is practiced on citrus sources: naringin, limonin, other bitterants, other flavonoids, limonoids, polymethoxylated flavones, phenolics, sugars, acids, vitamins and nutrients including vitamin C, minerals and so forth. Conversely, only between about 5% and 25% of these same components remain in the diafiltration retentate byproduct, which passes to a transfer member 17, a collection vessel 21, and to a receptacle 18 in this embodiment which is illustrated in FIG. 1.

It has been found that this byproduct can be used as an additive, such as through transfer member 20, for juice products. As such an additive, it provides an all-natural bland clouding agent which has been found to be instrumental in providing visual cues which allow a consumer to identify the juice source, even for a juice which has a very low bitterant level and has a reduced acidity level.

Depending upon the relative amount of water within the all-natural bland clouding agent byproduct prepared when diafiltration is practiced, it may be desired to reduce its water level in order to provide a somewhat more concentrated clouding agent. Typically, the water concentration of the pulpy retentate byproduct at area 21 is approximately 80 to 90 weight percent or less. In this instance, the all-natural bland clouding agent will move from area 21 to a separation apparatus 22 which is suitable for separating liquids and solids. A typical separation apparatus is a filter press. Other options include a centrifuge, a decanter, or a vibrating press. It can include traditional crossflow filtration filters or devices using vibrating filter technology. Passage of the all-natural bland clouding agent byproduct material through the separation apparatus 22 forms a pulp wash byproduct 23 and an all-natural bland concentrated pulp or clouding agent 24, typically having a water content of approximately 70 to 80 weight percent or less. This concentrated byproduct has properties similar to the all-natural bland clouding agent material 18, as adjusted by the reduced water level. If desired, this could be added to a juice product.

With further reference to FIG. 1, the separated juice serum flows through the transfer member 13 for resin processing at a resin treatment section 25. If desired, this can be combined with permeate flow or pulp byproduct flow from the transfer member 16 to the resin treatment section 25. This flow contains substantially all of the nutrients and other components from the flow into the diafiltration unit, when provided as illustrated in FIG. 1. This passage can be directly into the section 25 or into transfer member 13 before it enters treatment section 25.

At section 25, one or more columns 26, which contain resin(s) generally known as debittering resins, are included. This results in substantial reduction of naturally occurring compounds as discussed herein. Typically, adsorption resins are used in section 26. Commercial adsorption systems are available for use in section 26. They are styrene divinylbenzene resins. Preferred is AMBERLITE® XAD-16 resin from Rohm and Haas. Others are Alimentech 470, 495 and P685 resins, and Optipore SD-2 and L285 resins.

The shipping weight of XAD-16 is 0.71 gram/ml, 20 grams of this resin fill 28.1 milliliters, and 200 milliliters of juice volume correspond to 7.1 bed volumes of this resin, while 400 milliliters of juice volume correspond to 14.2 bed volumes, 600 milliliters corresponding to 21.3 bed volumes, and so forth. Alimentech 470 has a shipping weight of 0.68 gram/ml, and 20 grams of this resin take up 29.4 milliliters, with 200 milliliters of juice volume corresponding to 6.8 bed volumes of this resin, 400 milliliters corresponding to 13.6 bed volumes, 600 milliliters corresponding to 20.4 bed volumes, and so forth. The shipping weight of Alimentech 495 is 0.73 gram/ml, and 20 grams of this resin take up 27.4 milliliters, with 200 milliliters of juice volume corresponding to 7.3 bed volumes for this resin, 400 milliliters corresponding to 14.6 bed volumes, 600 milliliters corresponding to 21.9 bed volumes, and so forth. The shipping weight of Optipore SD-2 is 0.67 gram/ml, and 20 grams of this resin take up 29.9 milliliters, with 200 milliliters corresponding to 6.7 bed volumes for this resin, 400 milliliters corresponding to 13.4 bed volumes, 600 milliliters corresponding to 20.1 bed volumes, and so forth. The shipping weight of Optipore L285 is 0.64 gram/ml, and 20 grams of this resin take up 31.2 milliliters, with 200 milliliters corresponding to 12.8 bed volumes, 600 milliliters corresponding to 19.2 bed volumes, and so forth.

Section 26 removes from citrus juice sources flavonoids such as naringin which is the predominant flavanone glycoside that naturally occurs in grapefruit. Compounds falling within the limonoids group which are found in citrus fruits, including limonin and nomilin, also are removed by this resin. Other bittering agents can be removed here. The non-bitterant flavanone hesperidin glycoside, which is predominant in orange and tangerine citrus fruits, is removed from such sources by this resin in section 26. All of these types of components and others noted herein are substantially reduced according to the invention.

With particular reference to grapefruit, when a substantial quantity of the naringin content is removed, the result is a grapefruit juice which is substantially less bitter than grapefruit juice which is not thus processed. When the naringin level is especially substantially reduced, it can be difficult to identify the resultant juice materials as grapefruit originating. It will be appreciated that varying naringin levels can be selected; for example, between about 20 ppm and about 200 ppm naringin can remain. For many products, the naringin level will be between about 50 ppm and 150 ppm. An especially bland or debittered grapefruit juice product which is suitable for use as a clear filler juice—which may be recognized as grapefruit juice (when the naringin level is about 200 ppm, typically not greater than this level) when tasted alone—has a naringin level of between about 80 ppm and about 180 ppm, often not greater than about 120 ppm. This can be generally referred to as a clear filler juice.

It will be appreciated that the acidity of the juice source 11 can be reduced. In these instances, the section 25 includes one or more deacidification columns 27 and receives juice flow from transfer member 13 and transfer member 16 (when provided). Deacidification equipment represented by column 27 is generally known. It has the ability to significantly reduce the acid content of fruit juices. Many citrus juices have a natural acidity of at least about 0.5 weight percent. A typical acidity content after passage through column 27 and into a receptacle 28 will be between about 0.3 and about 0.9 weight percent. A typical range is between about 0.4 and about 0.8 weight percent acid, typically as citric acid.

Acidity also can play a role in identifying a juice as a particular citrus juice. For example, as recognized in U.S. Pat. No. 6,054,168, when it is desired to detect grapefruit-originating juice as a grapefruit juice, it is often desirable to have an acidity level generally between about 0.4 and about 0.8 weight percent. It has been found that maintaining this acidity level, which can be augmented by adding a relatively minor amount (for example as low as about 2 weight percent) of the all-natural bland clouding agent byproduct, results in the recognizability of the juice product as a grapefruit juice product, but without any of the negative flavor notes which have come to be associated with naringin in grapefruit juice.

Whether such a juice is only debittered or is both debittered and deacidified, it passes out of the section 25 and into a suitable receptacle 28. When thus fully processed, this, when originating from grapefruit, can be referred to as CDDGT (clarified, debittered, deacidified grapefruit juice).

Figure 2:
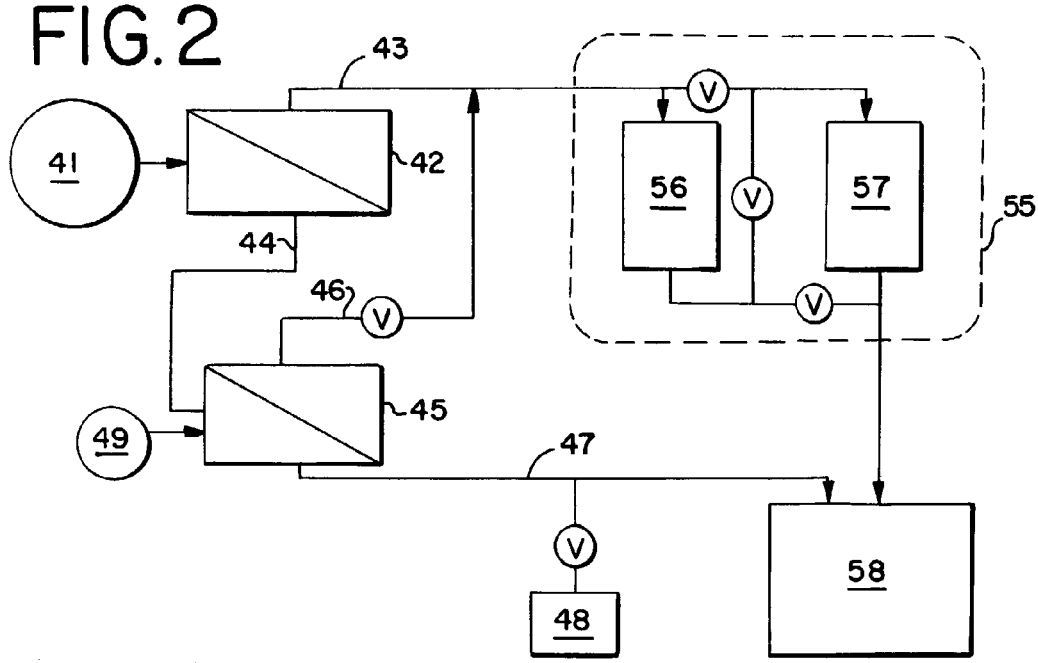
FIG. 2 is a schematic representation of another embodiment.
Figure 3:
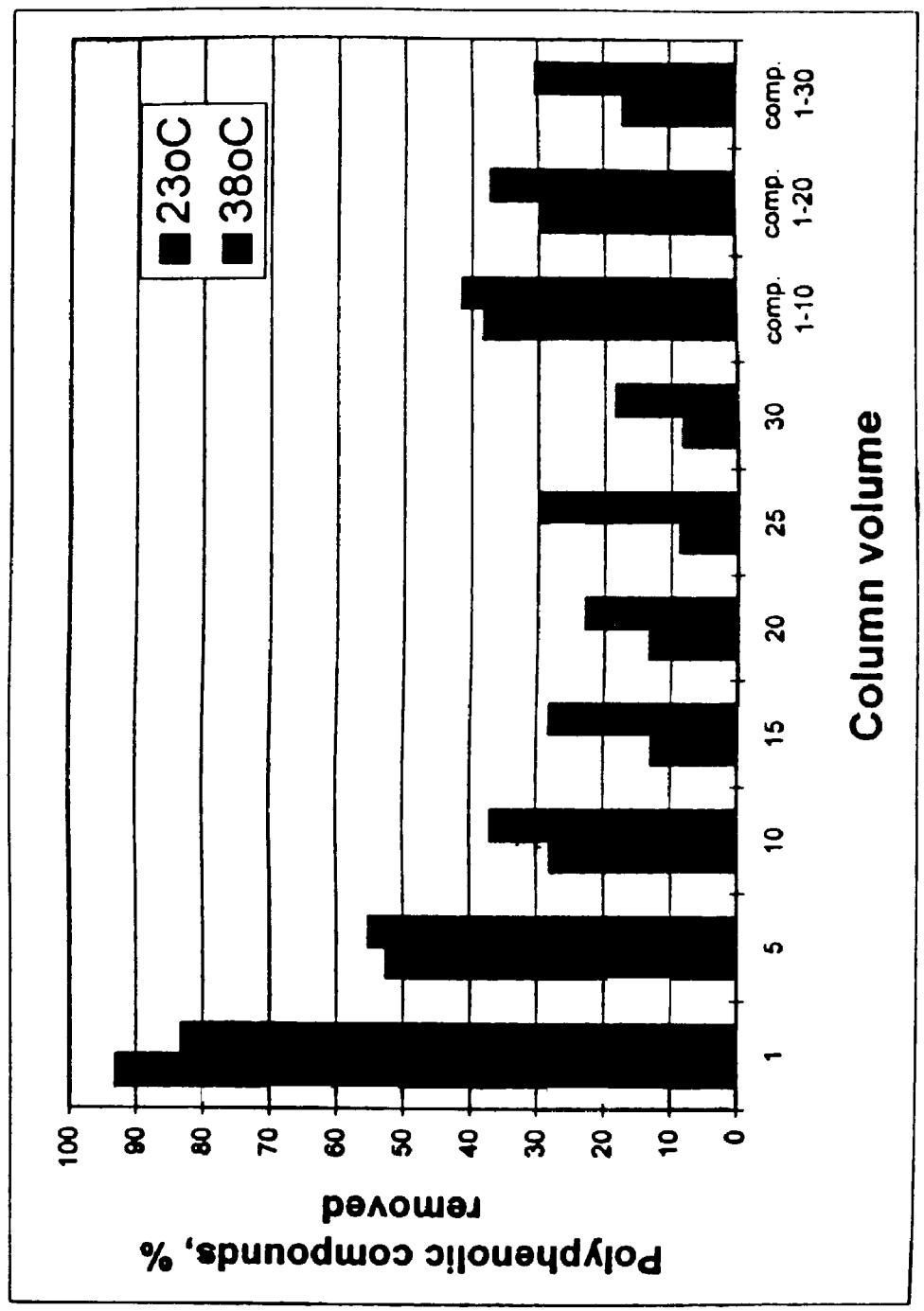
FIG. 3 is a plot of data showing reduction of polyphenolic compounds by practice of the invention.

Referring now to FIG. 2, with this embodiment, some or all of the all-natural bland clouding agent byproduct is added to the clear juice from a resin treatment section 55. If desired, this addition can be made within a receptacle for cloudy juice product 58, as generally illustrated. Excess all-natural bland clouding agent byproduct can be collected in receptacle 48.

The cloudy juice product 58 is useful as a cloudy filler juice or as a cloudy stand-alone juice. When the latter originates from a grapefruit source, it is a unique grapefruit juice product which is easily recognized as a grapefruit juice while avoiding what a segment of the population finds objectionable in unprocessed grapefruit juice, especially naringin content and also acidity, while still maintaining virtually the same level of pulp within the grapefruit juice. High pulp juice products also can be provided. In this instance, the pulp itself is not a source of objectionable levels of bitterants or acidity, but instead the bland pulp or clouding agent is reunited with the modified liquid component flowing from section 55. When the product is to be a cloudy filler juice, usually a lesser quantity of pulp can be added than for a cloudy stand-alone juice.

Generally speaking, in order for a juice to be properly labeled in accordance with governmental regulations, it must be organoleptically recognizable or identifiable as that juice. Typically, taste tests are instrumental in determining whether or not a juice is recognized as the particular juice, such as grapefruit juice. For example, a clear filler juice having a naringin level in the 120 ppm range (or in some cases lower) and an acidity in the 0.8 weight percent range (or in some cases lower) and a Brix value in the range of 10° Brix, may not be recognized as grapefruit juice by a majority of taste panelists, whereas adding the all-natural bland clouding agent to this formulation at a level of at least about 5 weight percent, based upon the total weight of the filler juice, results in a cloudy filler juice which consistently has been organoleptically identified as grapefruit juice by a majority of taste panelists.

As an additional example, when this same type of grapefruit-originating cloudy filler juice is used in making a blended juice product, with key juice sources, the fact that the product includes grapefruit juice as one of the juices was not readily detectable. This has the advantage of providing a filler juice which is a true natural juice without the at times perceived negative characteristic citrus juice flavor and especially the bitterness associated with it. Such a product has the nutritional positives of citrus juice without negatives which are perceived by certain segments of the population.

With further reference to FIG. 2, citrus juice source 41 flows into separation unit 42, with the permeate flowing out to transfer member 43 and the citrus pulp retentate flowing to transfer member 44 and into diafiltration unit 45 which is shown in this example. Wash source 49 flows into the diafiltration unit 45, while transfer member 46 receives the diafiltration permeate and transfer member 47 receives the diafiltration retentate. Resin columns 56 and/or columns 57 of the section 55 perform substantially as described above with respect to section 25.

Other embodiments can refrain from using the diafiltration process features and equipment mentioned herein in order to carry out solids reduction prior to resin treatment. For example, such can be omitted when the source of juice is of a type that undesirable solids can be removed by centrifugation techniques and/or other filtration techniques. After processing such as through an adsorption resin, additional components can be added. These include the retentate components which can supply an add-back of suspended solids such as pulp or cloud as discussed herein. Others include flavor components such as flavor add-backs for balancing oils and other flavor components, usually to restore sensory attributes lost during processing.

Illustrations of the disclosure herein are provided in the following Examples.

EXAMPLE 1

Reconstituted grapefruit juice (Brix 10.0°) was passed through a hollow fiber micro-filtration unit. In order to debitter the juice product flow, the permeate therefrom was passed through a Koch debittering resin column. During debittering, adsorption of naringin and other adsorbable grapefruit juice components onto the surface area of the resin material of the commercial unit was carried out using AMBERLITE® XAD-16 resin. The original naringin level was 735 ppm, and the juice permeate was debittered to a naringin level of about 120 ppm.

EXAMPLE 2

Orange peel cups collected from a juice extraction process were shredded into pieces ranging in size between approximately 3/16 inch and 3/4 inch. The shredded peel was contacted with water for 15 to 30 minutes at a peel-to-water ratio on the order of 1:1.

The resulting slurry was pressed to remove the peel solids from the juice. The thus prepared fresh peel juice was at a Brix level of between 4° and 8°. The juice phase was centrifuged and pasteurized, followed by membrane filtration in order to clarify the juice.

The clarified juice was passed through a column of AMBERLITE® XAD-16 adsorbent resin system. The resin system removed flavonoids, phenolic compounds and bitter limonoids. The thus clarified juice had improved flavor characteristics.

EXAMPLE 3

A run was made which utilized a Niro separation skid with two Koch Super-Core modules. Permeate therefrom is of lowered solids content so some suitably flows through an adsorption resin debittering column in order to remove compounds which are undesirable due to off-flavor attributes by which they are identified or which are characteristic of reactants thereof.

Cross-flow filtration of grapefruit juice was used in the removal of solubilized naringin from the retentate. Diafiltration was practiced in this run. Before making the first diafiltration water addition, the retentate was concentrated by initiating the cross-flow without water addition, the water reduction being from about 220 pounds to about 110 pounds, the reduction designating the amount of water removed during this initial concentration step. Thereafter, the 110 pounds of concentrated feed retentate were washed with 110 pounds of water at about 120° F. (48.9° C.), followed by a second wash of 110 pounds, and then a third wash of 55 pounds of water at about 120° F. (48.9° C.). Thus, the diafiltration was at 2.5 times the volume of the pulp material being diafiltered.

Initial grapefruit juice naringin level was 750 ppm, and the final retentate had a naringin level of 130 ppm. The initial acidity level was 0.91 weight percent, and the final acidity level of the diafiltered retentate was 0.24 weight percent. Initial Brix level was 11.28° Brix, and the final level was 4.35° Brix of the diafiltered retentate pulp material. Regarding color, the initial OJ Index was 30.9, and the final OJ Index of the retentate pulp material was 30.7. The "L" transmittance was 67.55 initially and 72.17 after diafiltration. The "a" transmittance was −4.65 initially and −3.83 after diafiltration. The "b" transmittance was 18.44 initially and 18.32 after diafiltration.

EXAMPLE 4

Orange peel material was pulled from the discharge of a commercial AME (Brown®) citrus juice extractor running mid-sized fruit of about 2 to 3 inches in diameter. The peel was Hammermill® pulverized into a puffy uniform consistency and blended with water at a ratio of 1:1. An enzyme blend of Rapidase® and Cytolase® was added to this slurry, with the enzyme assisting in breaking down of pectin cells.

The slurry then was passed to a Graver® tube press unit for separation purposes. The Brix of the permeate juice-like substance was between 9.0° and 10.0° for this peel juice product.

The peel juice was passed through MPF36 and MPF44 membranes in a Koch FC-3 cell using a nitrogen gas pressure source. The juice was at 100° F. (37.8° C.). The pH of the feed was 3.26, while that of the permeate was 3.35. This peel juice is improved by contacting it with an adsorption resin to reduce the levels of flavone glucosides or flavones such as narirutin, hesperidin glucoside, naringin glucoside, polyphenolic compounds, and compounds associated with browning including the polyphenol para-vinylguaiacol.

EXAMPLE 5

Taste tests were conducted on grapefruit juice products in order to evaluate whether or not the particular grapefruit juice product was identifiable as grapefruit juice. A control grapefruit juice was used in the taste comparisons, the control juice having these specifications: 3.23 pH, an acidity of 1.3 weight percent as citric acid, 10° Brix soluble solids, about 700 ppm naringin, and a natural and untreated pulp concentration of 10.5 volume percent.

A grapefruit juice formulation "A" was prepared with diafiltration, debittering with AMBERLITE® XAD-16 resin as disclosed in Mozaffar et al U.S. Pat. No. 5,817,354, and deacidification, as described herein to have the following specifications: 3.48 pH, an acidity of 0.82 weight percent as citric acid, 7.5° Brix soluble solids, 118 ppm of naringin, and a concentration of 12.5 volume percent of all-natural bland pulp material byproduct produced as described herein.

Another grapefruit formulation "B" prepared as described herein had the following specifications: 3.47 pH, an acidity of 0.78 weight percent as citric acid, 9.9° Brix soluble solids, 125 ppm naringin, and a concentration of 12.5 volume percent of the all-natural bland pulp material byproduct.

Each participant was questioned if he or she had consumed grapefruit juice within the last 30 days, this question being asked to distinguish grapefruit "users" from "nonusers". For the juice "A" test, 28.5% were placed in the user category, and 71.5% were placed in this non-user category. For the juice "B" test, 35% were placed into the user category, and 65% were placed in the non-user category. Each person taste tested the control and the grapefruit juice "A" and was asked if they would identify juice "A" as grapefruit juice. A total of 71.5% identified the juice as grapefruit juice, and 28.5% did not. For juice "B", 70% identified as grapefruit juice, and 30% did not.

A different grapefruit juice product, juice "C" was tested in the same manner. This juice product had these specifications: 3.74 pH, 0.64 weight percent acidity as citric acid, 9.8° Brix soluble solids, 125 ppm naringin, and 12.5% of the all-natural bland pulp byproduct. This panel had 22.5% grapefruit users and 77.5% non-users. 52.5% of the total respondents identified this juice product as grapefruit juice, whereas 47.5% did not identify it as grapefruit juice.

A further grapefruit juice formulation, juice "D" was subjected to the same taste testing. It was a clear juice as made herein with membrane filtration, debittering and deacidification (as needed), but contained no pulp. Its specifications were as follows: 3.48 pH, 0.82 weight percent acidity as citric acid, 10.1° Brix soluble solids, 123 ppm naringin, and no pulp (whether untreated or blanded). This panel included 30% grapefruit juice users and 70% nonusers. A total of only 42.5% of the panelists identified juice "D" as grapefruit juice, whereas 57.5% of the panelists did not identify this as grapefruit juice.

Another grapefruit juice formulation, juice "E" was taste tested in the same manner. Juice "E" had these specifications: 3.48 pH, 0.80 weight percent acidity as citric acid, 10.5° Brix soluble solids, 120.7 ppm naringin, and 3.8 volume percent of the all-natural bland pulp or clouding agent byproduct. This panel had 25% users and 75% nonusers, and 60% of the total respondents identified this juice product as grapefruit juice, whereas 40% did not identify it as grapefruit juice.

EXAMPLE 6

Further taste tests were conducted on grapefruit juice products generally as in Example 5, except the ratio of grapefruit juice "users" to "non-users" was selected to be 10 to 90, which is more in accordance with grapefruit juice consumption in the U.S.A. Also, the control grapefruit juice was consistently tasted after the formulation being evaluated. The control grapefruit juice used in the taste comparisons had these specifications: 3.23 pH, an acidity of 1.30 weight percent as citric acid, 10% Brix soluble solids, 642 ppm naringin, and a natural and untreated pulp concentration of 10.5 volume percent.

Each participant was questioned if he or she had consumed grapefruit juice within the last 30 days. For each test, 10% answered "yes", and these participants constituted the "user" category. Those answering "no" (90%) made up the "non-user" category for the following four formulations.

A grapefruit juice formulation "R" was prepared with diafiltration, debittering and deacidification (as needed), as described herein to have the following specifications: 3.84 pH, an acidity of 0.84 weight percent as citric acid, 10.1° Brix soluble solids, 118 ppm of naringin, and a concentration of 5.0 volume percent of the all-natural bland pulp material byproduct prepared by diafiltration techniques noted herein. Each person taste-tested the juice "R" and then the grapefruit control. Each was asked if he or she would identify juice "R" as grapefruit. A total of 87% identified the juice as grapefruit juice, and 13% did not.

Another grapefruit formulation "S" prepared as described herein with diafiltration, debittering and deacidification had the following specifications: 4.47 pH, an acidity of 0.40 weight percent as citric acid, 9.7° Brix soluble solids, 193 ppm naringin, and a concentration of 5.0 volume percent of the all-natural bland pulp material byproduct. For juice "S", 67% identified the juice as grapefruit juice, and 33% did not.

A different grapefruit juice product, juice "T" was tested in the same manner. This juice product had these specifications: 4.06 pH, 0.63 weight percent acidity as citric acid, 9.9° Brix soluble solids, 174 ppm naringin, and 5.0% of the all-natural bland pulp byproduct. 77% of the total respondents identified this juice "T" product as grapefruit juice, whereas 23% did not identify it as grapefruit juice.

A further grapefruit juice formulation, juice "U" was subjected to the same taste testing. It was a clear juice which was rather high in acidity and naringin and contained no pulp. Its specifications were as follows: 3.85 pH, 0.81 weight percent acidity as citric acid, 10.8° Brix soluble solids, 129 ppm naringin, and no pulp (whether untreated or blanded byproduct). A total of 69% of the panelists identified juice "D" as grapefruit juice, whereas 31% of the panelists did not identify this as grapefruit juice.

EXAMPLE 7

An orange and cranberry juice blend was prepared which incorporated the grapefruit cloudy filler juice made generally in accordance with FIG. 2. This cloudy grapefruit filler juice had the following average specifications: 3.84 pH, an acidity of 0.80 weight percent as citric acid, 150 ppm naringin, and 4 volume percent of the all-natural clouding agent or pulp byproduct prepared as described herein with diafiltration.

This cloudy grapefruit filler juice was concentrated to 59° Brix, after which it had a pH of 5.90. About 410 gallons of this cloudy grapefruit filler juice concentrate were blended with about 180 gallons of orange pulp wash concentrate of 65° Brix and 2.84 pH, about 130 gallons of orange concentrate at 65° Brix and 4.02 pH, about 120 gallons of cranberry concentrate at 47.7° Brix and 11.5 pH, an orange and cranberry flavor formulation, red colorant, and about 320 gallons water. This prepared a concentrated orange cranberry base product. A blended juice product was made from this base. An approximate 1000 gallon batch of such a blended juice product includes about 23 gallons of this orange cranberry base, about 115 gallons of high fructose corn syrup sweetener, and about 865 gallons of water. This single-strength product has an acidity of about 0.5 weight percent acid as citric acid, and is a juice product of about 13° Brix. Prior to blending, the cloudy filler juice was identifiable as grapefruit juice when at single strength. In the single-strength blended cloudy juice, the identifiable flavors were those of orange and cranberry and not of grapefruit.

EXAMPLE 8

Orange peels were shredded into pieces no larger than about ¾ inch. The smaller peel pieces were combined with water at water/peel ratios of 0.5/1 to 2.5/1. The water/peel slurry was pressed to separate the peel solids from the peel liquor (juice). The raw peel liquor was centrifuged to separate out a peel oil fraction and a sludge heavy phase from a peel juice having a Brix of about 4° to 8°, with a total solids of about 4 to 10 weight percent. The peel juice was processed through a membrane filtration system, and diafiltration was carried out generally as described in Example 1. The primary bitterants removed into the serum or clarified peel juice at this stage include limonin, citrus flavonoids, and polyphenolic compounds. The serum was treated with AMBERLITE® XAD-16 styrene divinylbenzene resin to reduce the quantity of limonin, citrus flavonoid and polyphenolic compounds in the serum. The serum was blended with traditional from concentrate orange juice at a level of about 20 percent by weight of the serum to make up an orange juice having sensory characteristics generally in line with the from concentrate juice.

EXAMPLE 9

Pulp wash from orange juice processing at 4° to 7° Brix is used as the originating citrus source for preparing an all-natural orange-originating juice beverage. Pulp wash is processed through the membrane filtration system of Example 1 to produce a serum or clarified fraction (permeate) and a concentrated pulp fraction byproduct containing the suspended solids. The pulp wash serum is contacted with AMBERLITE® XAD-16 to reduce level of bitterants including limonin.

EXAMPLE 10

Grapefruit juice was microfiltered through a 0.5 micrometer filter. The permeate was run through a 0.5 liter capacity resin column containing AMBERLITE® XAD-16 resin from Rohm & Haas. A control grapefruit juice which did not run through the adsorbsion resin had a Brix of 10.20°, an acidity of 0.91 weight percent, a pH of 3.44, a Vitamin C content of 18.33 mg/100 ml, and a naringin content of 527 ppm.

Analyses were made after the resin had treated the juice through certain bed volume flows. After the initial bed volume of use following complete resin regeneration, the Brix was 8.77°, the acidity was 0.73 weight percent, the pH was 3.56, the Vitamin C content was 13.88 mg/100 ml, and the naringin level was at zero ppm. After the resin had treated 4 bed volumes, the Brix was 9.93; the acidity was 0.90 weight percent, the pH was 3.47, the Vitamin C level was 19.46 mg/100 ml, and the naringin level was zero ppm. After 7 bed volumes of use, the Brix was 10.02°, the acidity was 0.91 weight percent, the pH was 3.46, the Vitamin C content was 19.59 mg/100 ml, and the naringin level was 27 ppm. Similar analyses were obtained after 8 and 9 bed volumes had been run, with the naringin level being 20 ppm after 8 bed volumes of use and 14 ppm after 9 bed volumes. After 14 bed volumes, the Brix, acidity and pH were about the same, with the Vitamin C level being 18.31 mg/100 ml, and the naringin being at 31 ppm. After 15 bed volumes, the Vitamin C was at 19.58 mg/100 ml, and the naringin was at 24 ppm. After 16 bed volumes, the Vitamin C content was at 18.98 mg/100 ml, and the naringin level was at 18 ppm. After 20 bed volume passes, the Vitamin C content was 19.13 mg/100 ml, and the naringin content was 19 ppm.

A composite analysis for bed volumes 1–10 gave a Brix of 9.83, an acidity of 0.88 weight percent, a pH of 3.48, a vitamin C level of 16.03 mg/100 ml, and a naringin value of 7 ppm. A composite analysis for bed volumes 1–20 gave a Brix of 9.94; an acidity of 0.90 weight percent, a pH of 3.48, a Vitamin C level of 16.44 mg/100 ml, and a naringin value of 14 ppm.

EXAMPLE 11

Permeate from filtered orange peel juice was passed through AMBERLITE® XAD-16 resin. Samples of this juice treated with adsorptive resin were submitted for chromatogram analysis. Samples were taken prior to processing through the resin, after the resin had treated only 1 bed volume, and after the resin had treated 15 bed volumes. A composite value for juice treated at the 1 bed volume stage through the 15 bed volume stage, and a composite of the 1 through 15 bed volume values plus retentate from the filtration system. Results are reported in Table I.

TABLE I

| Sample | Brix | Acid (wt %) | pH | Hesperidin (ppm) |
|---|---|---|---|---|
| Control | 7.65° | 0.20 | 4.26 | 296 |
| 1 BV | 6.63° | 0.15 | 4.41 | 8 |
| 15 BV | 7.40° | 0.19 | 4.27 | 14 |
| Composite | 7.25° | 0.19 | 4.30 | 2 |
| Composite + Retentate | 7.26° | 0.18 | 4.38 | 70 |

EXAMPLE 12

Single-strength juice having a Brix of 11.66° was prepared from Sunpure® orange peel extract. This was passed through AMBERLITE® XAD-16 resin in a polysulfone fiber column having a pump flow rate of between 92 and 101 ml/min. The thus treated juice was subjected to a spectrophotometric method to analyze for polyphenols (reading at 325 nm) which include para-vinylguaiacol (PVG). Data were taken at two different temperatures after selected numbers of bed volumes had been processed, and three different composite bed volumes were determined. The polyphenols are reported as the spectrophotomeric reading.

These data are reported in Table II.

TABLE II

| Bed Volume | 325 nm @ 23° C. | 325 nm @ 38° C. |
|---|---|---|
| 1 | 0.17 | 0.48 |
| 5 | 1.16 | 1.28 |
| 10 | 1.76 | 1.8 |
| 15 | 2.13 | 2.05 |
| 20 | 2.12 | 2.2 |
| 25 | 2.23 | 2 |
| 30 | 2.24 | 2.33 |
| comp. 1–10 | 1.51 | 1.67 |
| comp. 1–20 | 1.72 | 1.79 |
| comp. 1–30 | 2.03 | 1.99 |
| Control | 2.44 | 2.85 |

With the control as the basis, the percentage of polyphenols removed in accordance with this Example is reported for each instance in Table III.

TABLE III

| Bed Volume | Polyphenols Removed @ 23° C. (%) | Polyphenols Removed @ 38° C. (%) |
|---|---|---|
| 1 | 93.03 | 83.16 |
| 5 | 52.46 | 55.09 |
| 10 | 27.87 | 36.84 |
| 15 | 12.70 | 28.07 |
| 20 | 13.11 | 22.81 |
| 25 | 8.61 | 29.82 |
| 30 | 8.20 | 18.25 |
| comp. 1–10 | 38.11 | 41.40 |
| comp. 1–20 | 29.51 | 37.19 |
| comp. 1–30 | 16.80 | 30.18 |
| Control | 0 | 0 |

EXAMPLE 13

Para-vinylguaiacol is the most detrimental off-flavor compound formed during processing and storage of citrus juice. This characteristic off-flavor typically is found in aged canned juice. For example, it has been related to non-enzymatic browning. This is detected by spectrophotometer analysis. Citrus peel juice was subjected to microfiltration, and a peel juice which was pasteurized, finished and centrifuged was run through AMBERLITE® XAD-1600 resin. Discharge from the column was collected at 1, 5, 10 and 15 bed volumes, and a composite of the collections at 1–10 bed volumes was determined. The Brix of the juice going into column was 4.26°, and the temperature of the juice was 15° C. After the resin had passed 5 bed volumes of juice, the Brix reading was 3.77°.

Microfiltered retentate was diluted with filtered water to provide 1%, 5% and 10% of retentate. Spectrophotometer readings were taken at 325 nm. The reading for polyphenols at 325 nm was 0.052/0.058 for the retentate at 1% and 0.186/0.188 for the finished retentate at 1%. For the 5% retentate, the reading at 325 nm was 0.348/0.353, while for the finished retentate the reading was 0.249/0.255 at 5%. At 10% retentate, the reading was 0.504. It was 0.539 for the 10% finished retentate. The blank (auto zero) reading at 325 nm was 0.187.

EXAMPLE 14

AMBERLITE® XAD-16 resin was used in a set-up similar to the previous Example. The initial Brix of the peel juice was 3.82°. A 16-liter column contained 7 liters of the resin. The spectrophotometer reading at 325 nm for polyphenols was 2.420 for the control juice which had not been subjected to the resin treatment. It was 0.176 at the blank (auto zero) reading. The reading for the composite for collections after 1–15 bed volumes was 0.875, the Brix being 3.40°. After 15 bed volumes of flow, the reading at 325 nm was 1.212. After 10 bed volumes, the reading was 1.091. After 5 bed volumes, the reading was 0.514, and at 1 bed volume, the reading was 0.088.

EXAMPLE 15

Orange peel juice having a Brix of 3.65° was contacted with XAD-1600 resin and subjected to spectrophotometer analysis for polyphenols at 325 nm. The control was at 2.274. The blank (auto zero) was at 0.192. The readings after different bed volumes of treatment were as follows: 1 bed volume, −0.030; 5 bed volumes, 0.479; 10 bed volumes, 0.885; 15 bed volumes, 1.075; 20 bed volumes, 1.212; 25 bed volumes, 1.401; and 30 bed volumes, 1.367. The following composite bed volume readings were made: 1–10 composite, 0.556; 1–15 composite, 0.803; 1–20 composite, 0.914; and 1–30 composite, 0.953.

EXAMPLE 16

Orange peel juice was contacted with AMBERLITE® XAD-16 or XAD-1600 resin and subjected to spectrophotometer readings for polyphenols. A 0.5 liter column was used. Tropicana PURE PREMIUM® orange juice was subjected to spectrophotometer analysis for polyphenols at 345 nm. At full strength (12.38° Brix), the reading was 0.793. At 0.75 concentration (9.44° Brix), the reading was 0.577. At half concentration (6.05° Brix), the reading was 0.401. At 0.25 concentration (3.35° Brix), the reading was 0.326.

For the orange peel juice run through the XAD-1600 column, the polyphenol 325 nm reading was 0.227 for the blank (auto zero) and 2.076 for the control. After 5 bed volumes, this value was 0.841. After 10 bed volumes, this value was 1.091. After 15 bed volumes, this value was 1.145. The 1–10 bed volumes composite was at 0.883, and the 1–15 bed volumes composite was at 0.753.

For the XAD-16, the 325 nm polyphenol reading was 0.231 for the blank (auto zero) and 2.397 for the control. After 5 bed volumes, the reading was 0.834; after 10 bed volumes, 1.29; after 15 bed volumes, 1.304; after 20 bed volumes, 1.374; after 25 bed volumes, 1.640; and after 30 bed volumes, 1.723. For a 1–10 bed volumes composite, the 325 nm reading was 0.718. For a 1–15 bed volumes composite, the 325 nm reading was 1.082. For a 1–20 bed volumes composite, the 325 nm reading was 1.098, and for 1–30 composite, the reading was 1.270.

Some readings also were taken at 420 nm for detecting off-flavor, off-taste, darkening color precursors. These data are reported in Table IV.

TABLE IV

| XAD 16 | Reading at 420 nm | XAD 1600 | Reading at 420 nm |
|---|---|---|---|
| BV5 | 0.049 | BV5 | 0.029 |
| BV10 | 0.105 | BV10 | 0.035 |
| BV15 | 0.142 | BV15 | 0.056 |
| BV20 | 0.185 | BV20 | 0.034 |
| BV25 | 0.228 | BV25 | 0.055 |
| BV30 | 0.227 | BV30 | 0.059 |
| 1–10 Comp. | 0.155 | 1–10 Comp. | 0.029 |
| 1–15 Comp. | 0.090 | — | — |
| 1–20 Comp. | 0.110 | 1–20 Comp. | 0.026 |
| 1–30 Comp. | 0.154 | 1–30 Comp. | 0.037 |
| Control | 0.543 | Control | 0.442 |
| Blank | −0.010 (Auto Zero) | Blank | −0.001/0.001 |

EXAMPLE 17

Spectrophotometer readings were taken at 325 nm for polyphenolic compounds and at 420 nm for detecting off-flavor, off-taste, darkening color precursor components. These were taken on citrus sources which were not subjected to adsorption resin treatment and on citrus sources which were subjected to adsorption resin treatment. The former citrus sources were orange juice concentrate (OC) at six different Brix levels, orange pulp wash concentrate (PW) at six different Brix levels, Tropicana PURE PREMIUM® orange juice (PP) at five Brix levels, and an Australian peel extract (APE). The latter citrus sources were orange peel juice and from concentrate orange juice run through XAD-16 resin and XAD-1600 resin columns. Each had different levels of retentate add-back.

Data are reported in Table V. In this Table, the peel juice run through XAD-16 with 4% retentate add-back is identified as 16-4. The peel juice run through XAD-16 with 20% retentate add-back is designated 16-20. The peel juice run through XAD 1600 with 4% retentate add-back is designated 00-4. The peel juice run through XAD-1600 with 20% retentate add-back is designated 00-20. The from concentrate orange juice which was run through XAD-16 with 4% retentate add-back is designated C16-4. From concentrate orange juice was treated with XAD-16 resin, with a 20% high cook retentate add-back. This is identified as C16-20. From concentrate orange juice run through XAD-16 with 20% of a less cooked retentate add-back is identified as C16-20'. The from concentrate orange juice was also run through XAD-1600 resin, with a 20% retentate add-back. This is designated C00-20. The "×2" indicator in Table V signifies double the stated quantity for these samples which were diluted to half strength because reading at 325 nm showed best accuracy below 2.5. Thus, the last PW reading of 1.464(×2) means that the reading at 325 nm was 2.928.

TABLE V

| Sample | Brix (°) | Reading at 325 nm | Reading at 420 nm |
|---|---|---|---|
| OC | 4 | 0.320 | 0.073 |
| OC | 6 | 0.541 | 0.108 |
| OC | 8 | 0.665 | 0.140 |
| OC | 10 | 0.886 | 0.184 |
| OC | 12 | 1.026 | 0.219 |
| OC | 14 | 1.273 | 0.267 |
| PW | 4 | 0.682 | 0.094 |
| PW | 6 | 1.183 | 0.168 |
| PW | 8 | 1.583 | 0.239 |
| PW | 10 | 1.976 | 0.321 |
| PW | 12 | 2.350 | 0.408 |
| PW | 14 | 1.464 (×2) | 0.487 |
| PP | 3.23 | 0.219 | 0.049 |
| PP | 6.47 | 0.491 | 0.085 |
| PP | 9.36 | 0.716 | 0.113 |

TABLE V-continued

| Sample | Brix (°) | Reading at 325 nm | Reading at 420 nm |
|---|---|---|---|
| PP | 12.33 | 0.950 | 0.165 |
| Blank | — | 0.073 | 0.005 |
| Blank | — | 0.077 | 0.011 |
| APE | 11.54 | 1.390 (×2) | 0.773 |
| 16-4 | 3.34 | 0.791 | 0.034 |
| 16-20 | 3.29 | 1.158 | 0.050 |
| 00-4 | 3.20 | 0.908 | 0.010 |
| 00-20 | 3.21 | 1.121 | 0.025 |
| C16-4 | 12.03 | 1.5972 (×2) | 0.823 |
| C16-20 | 11.56 | 2.121 (×2) | 1.290 |
| C16-20' | 10.35 | 1.880 (×2) | 0.771 |
| C00-20 | 11.99 | 1.990 (×2) | 0.467 |

EXAMPLE 18

Grapefruit juice was passed through a unit having resin columns. This was a unit made by Sepragen. The juice was centrifuged and passed through a resin slurry. The overall appearance of the resin was a dark amber to golden color as a very fine resin having smaller fragments with a stringlike appearance. The feed grapefruit juice had a Brix of 10.74°, an acidity of 1.20 weight percent, and a naringin content of 690 ppm. The 2 bed volume sample had a Brix of 10.14°, an acidity of 1.00, and a naringin content of 76 ppm. The 3 bed volume sample had a Brix of 10.43°, an acidity of 1.14, and a naringin content of 103 ppm. The 4 bed volume sample had a Brix of 10.54°, an acidity of 1.18, and a naringin content of 104 ppm. The 5 bed volume sample had a Brix of 10.54°, an acidity of 1.18, and a naringin content of 99 ppm. The 6 bed volume sample had a Brix of 10.54°, an acidity of 1.8, and a naringin content of 106 ppm.

EXAMPLE 19

Golden grapefruit juice was run through a 0.1 micron mircrofilter, the Brix level being 10.0°. This was passed through the Sepragen media, running through 24 bed volumes. The inflowing juice had a naringin content of 616 ppm, with the resin-treated juice having 0 ppm of naringin. Pectin also was reduced. It was lowered to about 0.3%. The original pectin level was somewhat under one percent by weight. This resin treatment was judged to effectively remove all flavonoids from the grapefruit juice.

EXAMPLE 20

A 15° Brix grapefruit juice passed through a 0.5 micron ceramic filter and through a resin debittering column. Before treatment its pH was 3.50, and its naringin content was 1487 ppm. When this juice passed through the first bed volume after regeneration, the naringin content was 328 ppm, while its pH was 3.73. The second bed volume run gave a pH of 3.53 and a naringin content of 445 ppm. The fourth bed volume run gave a pH of 3.48 and a naringin content of 5.35 ppm. At this stage, the composite naringin content was 452 ppm. After 6 bed volumes of use, the pH of the juice was 3.49, and its naringin content was 616 ppm. At the eighth bed volume run, the pH was 3.48, and the naringin content was 644 ppm. At this stage, the composite naringin level was 536 ppm. After the tenth bed volume of use the pH remained at 3.48, while the naringin level was 679 ppm. After the twelfth pass through, the pH remained the same, and the naringin content was 713 ppm. At this stage, the composite naringin content was 579 ppm. After 14 bed volumes of use, the pH was 3.50, and the naringin content was 733 ppm. At 16 bed volumes, the naringin content was 764 ppm, and the composite naringin content was 617 ppm.

EXAMPLE 21

Another grapefruit juice ran through a 0.5 micron ceramic filter and a Sepragen resin column having a debittering resin. The original Brix was 14.580, and the acidity was 1.61 weight percent, at a pH of 3.41. The initial naringin content of 953 ppm analyzed at 0 through the initial 10 bed volume runs through the resin column. After 28 runs through the bed volume, the composite naringin level was 55 ppm. Data regarding this testing are found in Table VI.

TABLE VI

| Bed Volume | PH | Naringin (ppm) | Composite Naringin (ppm) | Vitamin C (mg/100 ml) |
|---|---|---|---|---|
| 00 | 3.41 | 953.00 | 953.00 | |
| 01 | 4.22 | 0.00 | 0.00 | 0.00 |
| 02 | 3.36 | 0.00 | | 43.71 |
| 04 | 3.34 | 0.00 | 0.00 | |
| 06 | 3.33 | 0.00 | | 47.75 |
| 08 | 3.32 | 0.00 | 0.00 | |
| 10 | 3.31 | 0.00 | | 47.46 |
| 12 | 3.31 | 6.00 | 0.00 | |
| 14 | 3.31 | 16.00 | | 47.00 |
| 16 | 3.31 | 36.00 | 4.00 | |
| 18 | 3.36 | 61.00 | | 47.13 |
| 20 | 3.34 | 98.00 | 15.00 | |
| 22 | 3.33 | 139.00 | | 43.17 |
| 24 | 3.32 | 184.00 | 36.00 | |
| 26 | 3.32 | 220.00 | | 46.84 |
| 28 | 3.32 | 266.00 | 55.00 | 49.45 |

EXAMPLE 22

Grapefruit juice having a 10° Brix value was run through a Sepragen unit at 10 liters/minute of flow. Runs of the pasteurized juice were pulled at different times of flow. At 6 to 10 minutes of flow, the juice had a Brix of 7.92°, an acidity of 0.51 weight percent, a pH of 3.45, and a naringin content of 154 ppm. After 15 to 20 minutes of flow, the juice had a Brix of 9.31°, an acidity of 0.54 weight percent, a pH of 3.48, and a naringin content of 161 ppm. After 20 to 25 minutes of flow, the juice had a Brix of 9.33°, an acidity of 0.51 weight percent, a pH of 3.56, and a naringin content of 157 ppm.

EXAMPLE 23

A not-from-concentrate grapefruit juice was run through a ceramic 0.5 micrometer microfiltration unit. The permeate was run through a 20 liter Sepragen column having resin for debittering, at a flow rate of 10 liters per minute. Samples were pasteurized at 195° F. (90.6 C.). The ultrafiltered juice had a Brix of 9.31° and an acidity of 0.91, with a pH of 3.4, a Vitamin C content of 26.36 mg/100 ml, and a naringin content of 563 ppm. After running through the resin, the Brix was 8.72°, the acidity was 0.80 weight percent, the pH was 3.4, the Vitamin C level was 23.67 mg/100 ml, and the naringin content was 0 ppm.

Samples were put up into one-liter bottles and stored for six weeks at 35° F. (about 2° C.). Juices which were bottled were taken from the supply, either before or after resin treatment. After the six weeks, the samples which were not resin treated had a Brix of 9.32°, an acidity of 0.91 weight percent, a pH of 3.4, Vitamin C of 26.52 mg/100 ml, and 558 ppm naringin. The bottled and stored samples which had been run through the resin had a Brix of 8.72°, an acidity of 0.79, a pH of 3.4, a Vitamin C content of 24.54 mg/100 ml, and a 0 ppm naringin content.

EXAMPLE 24

Orange peel juice was prepared from peel discharge of commercial juice extractors. This provided a feed peel juice having a Brix of 8.75° and an acidity of 0.24, with a pH of 4.18 and a total solids of 11.90 weight percent. This feed was centrifuged to provide a juice phase having a Brix of 8.72°, an acidity of 0.23, a pH of 4.16, and a solids content of 10.53 weight percent. No limonin was detected.

The thus prepared juice phase was passed through a 0.5 micrometer microfiltration unit. The retentate at the filter had a Brix of 10.92°, an acidity of 0.25 weight percent, a pH of 4.18, a Vitamin C content of 1.69 mg/100 ml, and a total solids content of 13.13 weight percent. The thus-prepared peel juice permeate had a Brix of 7.64°, and an acidity of 0.20 weight percent, a pH of 4.15, a Vitamin C content of 6.81 mg/100 ml, and a total solids content of 8.43 weight percent.

This peel juice permeate was then run through a column of AMBERLITE® XAD-16 resin to prepare a peel juice having a Brix of 7.41°, an acidity of 0.16, a pH of 4.57, a Vitamin C content of 34.10 mg/100 ml, an oil content of 0.020 weight percent, and a limonin content of 16.0 ppm.

Another run on the centrifuging and microfiltration equipment prepared a microfiltered citrus peel juice permeate having a Brix of 4.50°, an acidity of 0.11 weight percent, a pH of 4.32, oil at 0.002 weight percent, a Vitamin C level of 5.65 mg/100 ml, a limonin content of 1.1 ppm, and a hesperidin content of 131 ppm. After centrifugation, but prior to microfiltration, the juice source had no detected limonin and a hesperidin content of 319 ppm.

In other runs, juice prepared from orange peel collected from juice extractors manufactured by FMC was analyzed to have a Brix of 10.56°, an acidity of 0.18 weight percent, a pH of 4.52, an oil content of 3.52 weight percent, and a hesperidin content of 1419 ppm, with no Vitamin C or limonin being detected. This was compared with peel juice made from peels from oranges processed through a Brown® extractor manufactured by AME. The peel juice from this source, before passage through any resin column, had a Brix of 5.39°, an acidity of 0.10 weight percent, a pH of 5.04, an oil content of 3.94 weight percent, and a hesperidin content of 1031 ppm, no Vitamin C or limonine being detected.

EXAMPLE 25

Orange juice was prepared from peels discarded by commercial orange juice extractors. The peels were shredded and pressed, solids were separated, and the resulting raw juice was subjected to microfiltration and passage through XAD-16 resin. Analyses were made for determining flavanoids and limonoids. Other samples were submitted for analysis concerning carotenoids and flavanoids. The juices were at a typical single-strength level, namely 11.8° Brix. Concerning the limonoids, contents of the following were measured: nomolin, limonin, and an estimate of total limonoids. The flavanoid compounds measured were: narirutin, naringin, hesperidin, neohesperidin (hespridin glucoside), naringenin and hesperitin. The polymethoxylated flavones were: sinensetin, heptamethoxyflavone, nobiletin and tangeretin.

EXAMPLE 26

Citrus juice supplies were prepared and run through AMBERLITE® XAD-16 resin and were analyzed for narirutin. HPLC was used. Collected values were 61 ppm, 13 ppm, 8 ppm and 4 ppm of narirutin within the juice.

EXAMPLE 27

Juice prepared from Hamlin orange peels as generally discussed herein was pasteurized. The juice was analyzed and the following average values were reported: limonoids, 584 ppm; hesperidin, 746 ppm; sinensetin, 32 ppm; nobiletin, 20 ppm; heptamethoxyflavone, 18 ppm; and tangeritin, 3 ppm. Samples of this juice which had been run through XAD-16 resin were analyzed in the same manner, and none of these components was detected in that resin-treated juice.

EXAMPLE 28

Orange juice was prepared from peels discarded by commercial orange juice extractors. The peels were shredded and pressed, solids were separated, and the resulting raw juice was subjected to filtration and passage through XAD-16 resin. In addition, the juice was pasteurized. Prior to passage through the resin, the Brix was 3.75, the acidity was 0.14 weight percent, the limonin content was 8.42 ppm, the hesperidin content was 154 ppm, the PVG content was 2.05 ppm, linalool was 4.57 ppm, alpha-terpineol content was 2.47 ppm, and the 4-vinylphenol content was 0.15 ppm.

After the resin was used through 24 bed volumes, the Brix was 3.64, the acidity was 0.13 weight percent, no limonin was detected, the hesperidin content was 6.09 ppm, the PVG content was 0.9 ppm, the linalool content was 1.43 ppm, the alpha-terpineol content was 2.87 ppm, and the 4-vinylphenol content was 0.07 ppm.

After the resin was used through 40 bed volumes, the Brix was 5.01, the acidity was 0.20 weight percent, no limonin was detected, the hesperidin content was 43.42 ppm, the PVG content was 2.84 ppm, the linalool content was 2.18 ppm, the alpha-terpineol content was 4.48 ppm, and the 4-vinylphenol content was 0.28 ppm.

After the resin was used through 1–24 bed volumes, the composite values were as follows: the Brix was 3.51, the acidity was 0.13 weight percent, no limonin was detected, the hesperidin content was less than 1 ppm, the PVG content was 0.33 ppm, the linalool content was 1 ppm, the alpha-terpineol content was 2.06 ppm, and the 4-vinylphenol content was 0.01 ppm.

After the resin was used through 1–40 bed volumes, the composite values were as follows: Brix was 3.92, the acidity was 0.16 weight percent, no limonin was detected, the hesperidin content was 5.96 ppm, the PVG content was 0.76 ppm, the linalool content was 1.29 ppm, the alpha-terpineol content was 2.75 ppm, and the 4-vinylphenol content was 0.05 ppm.

EXAMPLE 29

Orange juice was prepared from peels discarded by commercial orange juice extractors. The peels were shredded and pressed, solids were separated, and the resulting raw juice was subjected to filtration and passage through XAD-16 resin or through P685 resin. In addition, the juice was pasteurized.

Prior to passage through the XAD-16 resin, the Brix was 3.46, the acidity was 0.13 weight percent, the limonin content was 9.2 ppm, the hesperidin content was 153 ppm, the reading at 280 nm was 0.22, the reading at 325 nm was 1.94, the PVG content was 5.48 ppm, linalool content was 4.83 ppm, alpha-terpineol content was 2.59 ppm, and the 4-vinylphenol content was 0.54 ppm.

After the XAD-16 resin was used through 20 bed volumes, the Brix was 3.44, the acidity was 0.12 weight percent, no limonin was detected, no hesperidin was detected, the reading at 280 nm was 0.13, the reading at 325 ppm was 0.94, the PVG content was 6.48 ppm, linalool content was 0.57 ppm, alpha-terpineol content was 1.85 ppm, and the 4-vinylphenol content was 0.75 ppm.

After the XAD-16 resin was used through 40 bed volumes, the Brix was 3.55, the acidity was 0.13 weight percent, no limonin was detected, no hesperidin was detected, the reading at 280 nm was 0.30, the reading at 325 nm was 1.34, the PVG content was 6.86 ppm, linalool content was 0.92 ppm, alpha-terpineol content was 2.87 ppm, and the 4-vinylphenol content was 0.66 ppm.

After the XAD-16 resin was used through 1–40 bed volumes, the composite values were as follows: Brix was 3.44, the acidity was 0.12 weight percent, no limonin was detected, no hesperidin was detected, the reading at 280 nm was 0.22, the reading at 325 nm was 0.95, the PVG content was 0.60 ppm, the linalool content was 0.56 ppm, the alpha-terpineol content was 1.85 ppm, and the 4-vinylphenol content was 0.06 ppm.

Prior to passage through the P685 resin, the Brix was 3.67, the acidity was 0.13 weight percent, the limonin content was 9.2 ppm, the hesperidin content was 246 ppm, the reading at 280 nm was 0.34, and the reading at 325 nm was 1.88, and the PVG content was about the same as the feed into the XAD-16 resin.

After the P685 resin was used through 20 bed volumes, the Brix was 3.34, the acidity was 0.12 weight percent, no limonin was detected, no hesperidin was detected, the reading at 280 nm was 0.15, the reading at 325 ppm was 0.22, the PVG content was 0.10 ppm, linalool content was 0.09 ppm, alpha-terpineol content was 0.06 ppm, and no 4-vinylphenol was detected.

After the P685 resin was used through 40 bed volumes, the Brix was 3.51, the acidity was 0.13 weight percent, the limonin detected was less than 1 ppm, the hesperidin content was 75 ppm, the reading at 280 nm was 0.22, the reading at 325 nm was 0.83, the PVG content was 0.46 ppm, linalool content was 0.08 ppm, alpha-terpineol content was 0.04 ppm, and the 4-vinylphenol content was 0.04 ppm.

After the P685 resin was used through 1–40 bed volumes, the composite values were as follows: Brix was 3.34, the acidity was 0.11 weight percent, no limonin was detected, the hesperidin content was 23 ppm, the reading at 280 nm was 0.20, the reading at 325 nm was 0.29, the PVG content was 0.07 ppm, the linalool content was 0.05 ppm, no alpha-terpineol was detected, and no 4-vinylphenol was detected.

EXAMPLE 30

Orange juice was prepared from peels discarded by commercial orange juice extractors. The peels were shredded and pressed, solids were separated, and the resulting raw juice was subjected to filtration and passage through a resin bed of combined XAD-16 resin and P685 resin. The juice was not pasteurized. Prior to passage through the resin, the Brix was 4.58, the acidity was 0.23 weight percent, the limonin content was 1.52 ppm, the hesperidin content was 269.6 ppm, the PVG content was 5.82 ppm, linalool was 9.22 ppm, alpha-terpineol was 1.79 ppm, and the 4-vinylphenol content was 0.58 ppm.

After the resin was used through 14 bed volumes, the Brix was 4.31, the acidity was 0.24 weight percent, less than 1 ppm of limonin was detected, the hesperidin content was 42 ppm, the PVG content was 0.39 ppm, linalool content was 0.44 ppm, alpha-terpineol content was 0.12 ppm, and 4-vinylphenol content was 0.03 ppm.

After the resin was used through 1–15 bed volumes, the composite values were as follows: Brix was 4.17, the acidity was 0.17 weight percent, less than 1 ppm of limonin was detected, the hesperidin content was 31 ppm, the PVG content was 0.06 ppm, the linalool content was 0.18 ppm, the alpha-terpineol content was 0.04 ppm, and no 4-vinylphenol was detected.

EXAMPLE 31

Orange juice was prepared from peels discarded by commercial orange juice extractors. The peels were shredded and pressed, solids were separated, and the resulting raw juice was subjected to filtration and passage through a resin bed of combined Alimentech P495 resin and P685 resin. The juice was not pasteurized.

Prior to passage through the combined resin, the Brix was 4.85, the acidity was 0.23 weight percent, the limonin content was 1.93 ppm, the hesperidin content was 238.8 ppm, the PVG content was 5.67 ppm, the linalool content was 9.26 ppm, alpha-terpineol was 1.78 ppm, and the 4-vinylphenol content was 0.55 ppm.

After the combined resin was used through 15 bed volumes, the Brix was 4.34, the acidity was 0.24 weight percent, less than 1 ppm of limonin was detected, the hesperidin content was 69.03 ppm, the PVG content was 0.15 ppm, no linalool was detected, the alpha-terpineol content was 0.02 ppm, and no 4-vinylphenol was detected.

After the combined resin was used through 1–15 bed volumes, the composite values were as follows: Brix was 4.14, the acidity was 0.24 weight percent, less than 1 ppm of limonin was detected, the hesperidin content was 64.97 ppm, the PVG content was 0.02 ppm, no linalool was detected, the alpha-terpineol content was 0.02 ppm, and no 4-vinylphenol was detected.

EXAMPLE 32

Orange juice was prepared from peels discarded by commercial orange juice extractors. The peels were shredded and pressed, solids were separated, and the resulting raw juice was subjected to filtration and passage through XAD-16 resin. The juice was not pasteurized. Prior to passage through the resin, the Brix was 4.23, the acidity was 0.19 weight percent, the limonin content was 5.1 ppm, the hesperidin content was 291 ppm, the PVG content was 5.18 ppm, the linalool content was 3.88 ppm, the alpha-terpineol content was 1.54 ppm, and the 4-vinylphenol content was 0.40 ppm.

After the resin was used through 5 bed volumes, the Brix was 3.74, the acidity was 0.18 weight percent, no limonin was detected, no hesperidin was detected, the PVC content was 0.02 ppm, and no linalool, alpha-terpineol or 4-vinylphenol were detected.

After the resin was used through 15 bed volumes, the Brix was 3.67, the acidity was 0.19 weight percent, no limonin was detected, no hesperidin was detected, the PVG content was 0.03 ppm, and no linalool, alpha-terpineol or 4-vinylphenol were detected.

After the resin was used through 18 bed volumes, the Brix was 3.74, the acidity was 0.19 weight percent, no limonin was detected, no hesperidin was detected, the PVG content was 0.22 ppm, and no linalool, alpha-terpineol or 4-vinylphenol were detected.

After the resin was used through 1–21 bed volumes, the composite values were as follows: Brix was 3.65, the acidity was 0.18 weight percent, no limonin was detected, no hesperidin was detected, the PVG content was 0.08 ppm, and no linalool, alpha-terpineol or 4-vinylphenol were detected.

After the resin was used through 22–29 bed volumes, the composite values were as follows: Brix was 3.62, the acidity was 0.18 weight percent, no limonin was detected, no hesperidin was detected, the PVG content was 1.13 ppm, no linalool was detected, no alpha-terpineol was detected, and the 4-vinylphenol content was 0.24 ppm.

EXAMPLE 33

Orange juice was prepared from peels discarded by commercial orange juice extractors. The peels were shredded and pressed, solids were separated, and the resulting raw juice was subjected to microfiltration and passage of the permeate through Alimentech P685 resin. In addition, the juice was pasteurized.

Prior to passage through the resin, the Brix was 2.34, the acidity was 0.09 weight percent, the reading at 325 nm was 1.104 (adjusted to 10 Brix was 4.718), the limonin content was 13 ppm, the hesperidin content was 106 ppm, the PVG content was 0.46 ppm, the linalool content was 1.93 ppm, alpha-terpineol content was 0.97 ppm, and no 4-vinylphenol content was detected.

After the resin was used through 12 bed volumes, the Brix was 2.17, the reading at 325 nm was 0.011 (adjusted to 10 Brix was 0.051), no limonin was detected, no hesperidin was detected, and none of PVG, linalool, alpha-terpineol, or 4-vinylphenol were detected.

After the resin was used through 20 bed volumes, the Brix was 2.18, the reading at 325 nm was 0.068 (adjusted to 10 Brix was 0.312), no limonin was detected, no hesperidin was detected, and none of PVG, linalool, alpha-terpineol, or 4-vinylphenol were detected.

After the resin was used through 25 bed volumes, the Brix was 2.17, the acidity reading was 0.08 weight percent, the reading at 325 nm was 0.087 (adjusted to 10 Brix was 0.401), no limonin was detected, no hesperidin was detected, and none of PVG, linalool, alpha-terpineol, or 4-vinylphenol were detected.

After the P685 resin was used through 1–25 bed volumes, the composite values were as follows: Brix was 2.17, the acidity reading was 0.10 weight percent, the reading at 325 nm was 0.027 (adjusted to Brix 10 was 0.124), no limonin was detected, no hesperidin was detected, and no PVG, linalool, alpha-terpineol, or 4-vinylphenol were detected.

EXAMPLE 34

Orange juice was prepared from peels discarded by commercial orange juice extractors. The peels were shredded and pressed, solids were separated, and the resulting raw juice was subjected to microfiltration and passage of the permeate through Alimentech P685 resin. In addition, the juice was pasteurized.

Prior to passage through the resin, the Brix was 3.02, the acidity was 0.09 weight percent, the reading at 325 nm was 1.129 (adjusted to 10 Brix was 3.738), the limonin content was 13.5 ppm, the hesperidin content was 74 ppm, the PVG content was 0.27 ppm, the linalool content was 1.54 ppm, the alpha-terpineol content was 0.76 ppm, and no 4-vinylphenol content was detected.

After the resin was used through 12 bed volumes, the Brix was 2.06, the acidity was 0.07 weight percent, the reading at 325 nm was 0.003 (adjusted to 10 Brix was 0.014), no limonin was detected, no hesperidin was detected, and none of PVG, linalool, alpha-terpineol, or 4-vinylphenol were detected.

After the resin was used through 25 bed volumes, the Brix was 2.14, acidity was 0.09, the reading at 325 nm was 0.027 (adjusted to 10 Brix was 0.126), no limonin was detected, no hesperidin was detected, and none of PVG, linalool, alpha-terpineol, or 4-vinylphenol were detected.

After the P685 resin was used through 1–25 bed volumes, the composite values were as follows: Brix was 2.06, the acidity was 0.08, the reading at 325 nm was 0.003 (adjusted to Brix 10 was 0.014), no limonin was detected, no hesperidin was detected, and no PVG, linalool, alpha-terpineol, or 4-vinylphenol were detected.

EXAMPLE 35

Orange juice was prepared from peels discarded by commercial orange juice extractors. The peels were shredded and pressed, solids were separated, and the resulting raw juice was subjected to filtration and passage through Alimentech P495 resin. In addition, the juice was pasteurized.

Prior to passage through the resin, the Brix was 5.12, the acidity was 0.62 weight percent, the reading at 325 nm was 2.346 (adjusted to 10 Brix was 4.582), the limonin content was 22 ppm, the hesperidin content was 245 ppm, the PVG content was 11.02 ppm, the linalool content was 2.17 ppm, the alpha-terpineol content was 1.46 ppm, and the 4-vinylphenol content was 0.17 ppm.

After the resin was used through 1 bed volume, the Brix was 4.47, the acidity was 0.54 weight percent, the reading at 325 nm was 0.019 (adjusted to 10 Brix was 1.042), the PVG content was 0.02 ppm, the linalool content was 0.12 ppm, the alpha-terpineol content was 0.15 ppm, and no 4-vinylphenol was detected.

After the resin was used through 12 bed volumes, the Brix was 4.92, the reading at 325 nm was 0.930 (adjusted to 10 Brix was 1.890), the PVG content was 1.19 ppm, the linalool content was 0.17 ppm, the alpha-terpineol content was 0.34 ppm, and the 4-vinylphenol content was 0.05 ppm.

After the resin was used through 25 bed volumes, the Brix was 5.02, the reading at 325 nm was 1.668 (adjusted to 10 Brix was 3.362), no limonin was detected, the hesperidin content was 148 ppm, the PVG content was 4.35 ppm, the linalool content was 0.23 ppm, the alpha-terpineol content was 0.41 ppm, and the 4-vinylphenol content was 0.28 ppm.

After the resin was used through 1–25 bed volumes, the composite values were as follows: Brix was 4.91, the acidity was 0.61, the reading at 325 nm was 2.346 (adjusted to Brix 10 was 4.582), no limonin was detected, the hesperidin content was 107 ppm, the PVG content was 1.79 ppm, the linalool content was 0,18 ppm, the alpha-terpineol content was 0.30 ppm, and the 4-vinylphenol content was 0.08 ppm.

EXAMPLE 36

Orange juice was prepared from peels discarded by commercial orange juice extractors. The peels were shredded and pressed, solids were separated, and the resulting raw juice was subjected to filtration and passage through Alimentech P495 resin. In addition, the juice was pasteurized.

Prior to passage through the resin, the Brix was 5.10, the acidity was 0.62 weight percent, the reading at 325 nm was 1.776 (adjusted to 10 Brix was 3.482), the limonin content was 33 ppm, the hesperidin content was 181 ppm, the PVG content was 11.61 ppm, the linalool content was 2.26 ppm, the alpha-terpineol content was 1.62 ppm, and the 4-vinylphenol content was 0.81 ppm.

After the resin was used through 1 bed volume, the Brix was 4.46, the acidity was 0.51 weight percent, the reading at 325 nm was 0.005 (adjusted to 10 Brix was 0.011), the limonin content was less than 1 ppm, no hesperidin was detected, the PVG content was 0.03 ppm, the linalool content was 0.05 ppm, the alpha-terpineol content was 0.06 ppm, no 4-vinylphenol was detected, and the terpin-4-ol content was 0.17 ppm.

After the resin was used through 12 bed volumes, the Brix was 4.89, the reading at 325 nm was 0.797 (adjusted to 10 Brix was 1.630), no limonin or hesperidin were detected, the PVG content was 1.35 ppm, the linalool content was 0.08 ppm, the alpha-terpineol content was 0.11 ppm, and the 4-vinylphenol content was 0.05 ppm.

After the resin was used through 25 bed volumes, the Brix was 4.99, the reading at 325 nm was 1.466 (adjusted to 10 Brix was 2.938), no limonin was detected, the hesperidin content was 38 ppm, the PVG content was 4.56 ppm, the linalool content was 0.10 ppm, the alpha-terpineol content was 0.25 ppm, and the 4-vinylphenol content was 0.35 ppm.

After the resin was used through 1–25 bed volumes, the composite values were as follows: Brix was 4.79, the acidity was 0.60, the reading at 325 nm was 0.863 (adjusted to Brix 10 was 1.802), no limonin was detected, the hesperidin content was 3 ppm, the PVG content was 1.70 ppm, the linalool content was 0.07 ppm, the alpha-terpineol content was 0.11 ppm, and the 4-vinylphenol content was 0.04 ppm.

EXAMPLE 37

Orange juice was prepared from peels discarded by commercial orange juice extractors. The peels were shredded and pressed, solids were separated, and the resulting raw juice was subjected to filtration and passage through Alimentech P495 resin. In addition, the juice was pasteurized.

Prior to passage through the resin, the Brix was 5.09, the acidity was 0.61 weight percent, the reading at 325 nm was 1.869 (adjusted to 10 Brix was 3.672), the limonin content was 33 ppm, the hesperidin content was 262 ppm, the PVG content was 11.33 ppm, the linalool content was 2.23 ppm, the alpha-terpineol content was 1.60 ppm, and the 4-vinylphenol content was 0.85 ppm.

After the resin was used through 1 bed volume, the Brix was 4.59, the acidity was 0.57 weight percent, the reading at 325 nm was 0.019 (adjusted to 10 Brix was 0.041), no limonin or hesperidin were detected, the PVG content was 0.06 ppm, no alpha-terpineol was detected, and no 4-vinylphenol was detected.

After the resin was used through 12 bed volumes, the Brix was 4.92, the reading at 325 nm was 0.617 (adjusted to 10 Brix was 1.254), no limonin was detected, the hesperidin content was 15 ppm, the PVG content was 0.99 ppm, and the 4-vinylphenol content was 0.03 ppm.

After the resin was used through 25 bed volumes, the Brix was 5.01, the reading at 325 nm was 1.295 (adjusted to 10 Brix was 2.585), no limonin was detected, no hesperidin detected, the PVG content was 3.90 ppm, the ethyl-3-hydroxyhexanoate content was 0.09 ppm, and the 4-vinylphenol content was 0.31 ppm.

After the resin was used through 1–25 bed volumes, the composite values were as follows: Brix was 4.90, the acidity was 0.60, the reading at 325 nm was 0.684 (adjusted to Brix 10 was 1.396), no limonin was detected, no hesperidin was detected, the PVG content was 1.39 ppm, no linalool was detected, and the 4-vinylphenol content was 0.03 ppm.

It will be understood that the embodiments of the present invention which have been described are illustrative of some of the applications of the principles of the present invention. Numerous modifications may be made by those skilled in the art without departing from the true spirit and scope of the invention.

The invention claimed is:

1. A process for providing an enhanced fruit juice supply, comprising:
    providing a fruit juice supply, the fruit juice supply having suspended solids and at least one naturally occurring component which detracts from the quality of the fruit juice supply;
    separating the fruit juice supply into a permeate juice liquid and a retentate containing a large percentage of the suspended solids of the fruit juice supply;
    passing the permeate juice liquid through an adsorption resin thereby removing from the permeate juice liquid a quantity of said naturally occurring component which detracts from the quality of the juice supply;
    collecting the juice liquid which has passed through the adsorption resin as an enhanced fruit juice supply;
    diafiltering the retentate to separate the retentate into a diafiltration permeate and a diafiltration retentate of a bland clouding agent byproduct having a reduced bitterant level; and
    combining the clouding agent byproduct with the enhanced fruit juice supply to form a cloudy juice product.

2. The process of claim 1, wherein said fruit juice supply is a citrus fruit juice supply.

3. The process of claim 2, wherein said citrus fruit juice supply is an orange juice supply.

4. The process of claim 3, wherein said orange juice supply is a pulp wash from orange juice processing.

5. The process of claim 3, wherein said orange juice supply is a single-strength juice prepared from orange peel extract.

6. The process of claim 3, wherein said orange juice supply is concentrated juice.

7. The process of claim 3, wherein said orange juice supply is not-from-concentrate orange juice.

8. The process of claim 3, wherein said orange juice supply is an orange peel juice prepared by a process comprising extracting orange juice from round oranges, collecting peel-containing byproduct from the round oranges from which the juice is extracted, and recovering orange peel juice from said peel-containing byproduct.

9. The process of claim 8, wherein said naturally occurring component which detracts from the quality of the juice supply is hesperidin which, after said passing of the fruit juice supply through the adsorption resin, is at a level of not greater than about 70 ppm of the enhanced fruit juice supply.

10. The process of claim 8, wherein said naturally occurring component which detracts from the quality of the juice supply is a polyphenol which, after said passing of the fruit juice supply through the adsorption resin, gives a gas chromatograph spectrophotomeric reading at 325 nm of not greater than about 2 at 23° C. for up to 20 composite bed volumes of said resin.

11. The process of claim 8, wherein said naturally occurring component which detracts from the quality of the juice supply is a polyphenol which, after said passing of the fruit juice supply through the adsorption resin, gives a gas chromatograph spectrophotomeric reading at 325 nm of not greater than about 1 at 23° C. for up to 20 composite bed volumes of said resin.

12. The process of claim 2, wherein said citrus fruit juice supply is a grapefruit juice supply.

13. The process of claim 12, wherein said grapefruit juice supply is a pulp wash from grapefruit juice processing.

14. The process of claim 12, wherein said grapefruit juice supply is a single-strength juice prepared from grapefruit peel extract.

15. The process of claim 12, wherein said grapefruit juice supply is concentrated juice.

16. The process of claim 12, wherein said grapefruit juice supply is not from concentrate.

17. The process of claim 12, wherein said grapefruit supply is a grapefruit peel juice prepared by a process comprising extracting grapefruit juice from grapefruits, collecting peel-containing byproduct from the grapefruit from which the juice is extracted, and recovering grapefruit peel juice from said peel-containing byproduct.

18. The process of claim 1, further including combining said enhanced fruit juice supply with a retentate add-back which includes at least some of said retentate containing suspended solids collected during said separating of the fruit juice supply.

19. The process of claim 1, further including combining said enhanced fruit juice supply with a flavor component.

20. The process of claim 19, wherein said flavor component is a flavor add-back for the fruit juice supply.

21. The process of claim 1, further including combining said enhanced fruit juice supply with another juice source or a key flavor component for providing a blended juice product.

22. The process of claim 1, wherein said naturally occurring component which detracts from the quality of the juice supply is selected from the group consisting of a limonoid, a flavonoid, a carotenoid, and a polyphenolic compound.

23. The process of claim 1, wherein said fruit juice supply originates from grapefruits, and said naturally occurring component which detracts from the quality of the juice supply is naringin which, after said passing of the fruit juice supply through the adsorption resin, is at a level of not greater than about 200 ppm of the enhanced fruit juice supply.

24. The process of claim 1, wherein said fruit juice supply originates from grapefruits, and said naturally occurring component which detracts from the quality of the juice supply is naringin which, after said passing of the fruit juice supply through the adsorption resin, is at a level of not greater than about 120 ppm of the enhanced fruit juice supply.

25. The process of claim 1, wherein said fruit juice supply originates from oranges, and said naturally occurring component which detracts from the quality of the juice supply is limonin, after said passing of the fruit juice supply through the adsorption resin, is at a level of not greater than about 20 ppm of the enhanced fruit juice supply.

26. The process of claim 1, wherein said naturally occurring component which detracts from the quality of the juice supply is a polyphenol which, after said passing of the fruit juice supply through the adsorption resin, gives a gas chromatograph spectrophotomeric reading at 325 nm of not greater than about 0.2 at 23° C. for the first bed volume of said resin after its complete regeneration.

27. The process of claim 1, wherein said naturally occurring component which detracts from the quality of the juice supply is a polyphenol which, after said passing of the fruit juice supply through the adsorption resin, gives a gas chromatograph spectrophotomeric reading at 325 nm of not greater than about 0.1 at 23° C. for the first bed volume of said resin after its complete regeneration.

28. The process of claim 1, wherein said naturally occurring component which detracts from the quality of the juice supply is para-vinylguaiacol which, after said passing of the fruit juice supply through the adsorption resin, is reduced by at least about 90 percent in the enhanced fruit juice supply when compared with the fruit juice supply after the first volume of said resin after its complete regeneration.

29. The process of claim 1, wherein said naturally occurring component which detracts from the quality of the juice supply is narirutin which, after said passing of the fruit juice supply through the adsorption resin, is at a level of not greater than about 10 ppm of the enhanced fruit juice supply.

30. The process of claim 1, wherein said juice supply is an orange peel juice prepared by a process comprising extracting orange juice from round oranges, collecting peel-containing byproduct from the round oranges from which the juice is extracted, and recovering orange peel juice from said peel-containing byproduct, and wherein said naturally occurring component which detracts from the quality of the juice supply is narirutin which, after said passing of the fruit juice supply through the adsorption resin, is reduced to a level of not greater than about 20 ppm of the enhanced fruit juice supply.

31. The process of claim 1, wherein said naturally occurring component which detracts from the quality of the juice supply is sinensetin which, after said passing of the fruit juice supply through the adsorption resin, is at a level of not greater than about 10 ppm of the enhanced fruit juice supply.

32. The process of claim 1, wherein said juice supply is an orange peel juice prepared by a process comprising extracting orange juice from round oranges, collecting peel-containing byproduct from the round oranges from which the juice is extracted, and recovering orange peel juice from said peel-containing byproduct, and wherein said naturally occurring component which detracts from the quality of the juice supply is sinensetin which, after said passing of the fruit juice supply through the adsorption resin, is reduced to a level of not greater than about 20 ppm of the enhanced fruit juice supply.

33. The process of claim 1, wherein said naturally occurring component which detracts from the quality of the juice supply is nobiletin which, after said passing of the fruit juice supply through the adsorption resin, is at a level of not greater than about 10 ppm of the enhanced fruit juice supply.

34. The process of claim 1, wherein said juice supply is an orange peel juice prepared by a process comprising extracting orange juice from round oranges, collecting peel-containing byproduct from the round oranges from which the juice is extracted, and recovering orange peel juice from said peel-containing byproduct, and wherein said naturally occurring component which detracts from the quality of the juice supply is nobiletin which, after said passing of the fruit juice supply through the adsorption resin, is reduced to a level of not greater than about 20 ppm of the enhanced fruit juice supply.

35. The process of claim 1, wherein said naturally occurring component which detracts from the quality of the juice supply is heptamethoxyflavone which, after said passing of the fruit juice supply through the adsorption resin, is at a level of not greater than about 5 ppm of the enhanced fruit juice supply.

36. The process of claim 1, wherein said juice supply is an orange peel juice prepared by a process comprising extracting orange juice from round oranges, collecting peel-containing byproduct from the round oranges from which the juice is extracted, and recovering orange peel juice from said peel-containing byproduct, and wherein said naturally occurring component which detracts from the quality of the juice supply is heptamethoxyflavone which, after said passing of the fruit juice supply through the adsorption resin, is reduced to a level of not greater than about 15 ppm of the enhanced fruit juice supply.

37. The process of claim 1, wherein said naturally occurring component which detracts from the quality of the juice supply is tangeritin which, after said passing of the fruit juice supply through the adsorption resin, is at a level of not greater than about 2 ppm of the enhanced fruit juice supply.

38. The process of claim 1, wherein said juice supply is an orange peel juice prepared by a process comprising extracting orange juice from round oranges, collecting peel-containing byproduct from the round oranges from which the juice is extracted, and recovering orange peel juice from said peel-containing byproduct, and wherein said naturally occurring component which detracts from the quality of the juice supply is tangeritin which, after said passing of the fruit juice supply through the adsorption resin, is reduced to a level of not greater than about 10 ppm of the enhanced fruit juice supply.

39. The process of claim 1, wherein said naturally occurring component which detracts from the quality of the juice supply is para-vinylguaiacol which, after said passing of the fruit juice supply through the adsorption resin, is reduced to a level of not greater than about 0.005 ppm of the enhanced fruit juice supply.

40. The process of claim 1, wherein said juice supply is an orange peel juice prepared by a process comprising extracting orange juice from round oranges, collecting peel-containing byproduct from the round oranges from which the juice is extracted, and recovering orange peel juice from said peel containing byproduct, and wherein said naturally occurring component which detracts from the quality of the juice supply is para-vinylguaiacol which, after said passing of the fruit juice supply through the adsorption resin, is reduced to a level of not greater than about 0.1 ppm of the enhanced fruit juice supply.

41. The process of claim 1, wherein said juice supply is an orange peel juice prepared by a process comprising extracting orange juice from round oranges, collecting peel-containing byproduct from the round oranges from which the juice is extracted, and recovering orange peel juice from said peel-containing byproduct, and wherein said naturally occurring component which detracts from the quality of the juice supply is para-vinylguaiacol which, after said passing of the fruit juice supply through the adsorption resin, is reduced to a level of not greater than about 1 ppm of the enhanced fruit juice supply.

42. The process of claim 1, wherein said naturally occurring component which detracts from the quality of the juice supply is neohesperidin which, after said passing of the fruit juice supply through the adsorption resin, is at a level of not greater than about 1 ppm of the enhanced fruit juice supply.

43. The process of claim 1, wherein said juice supply is an orange peel juice prepared by a process comprising extracting orange juice from round oranges, collecting peel-containing byproduct from the round oranges from which the juice is extracted, and recovering orange peel juice from said peel-containing byproduct, and wherein said naturally occurring component which detracts from the quality of the juice supply is naringenin which, after said passing of the fruit juice supply through the adsorption resin, is reduced to a level of not greater than about 5 ppm of the enhanced fruit juice supply.

44. The process of claim 1, wherein said juice supply is an orange peel juice prepared by a process comprising extracting orange juice from round oranges, collecting peel-containing byproduct from the round oranges from which the juice is extracted, and recovering orange peel juice from said peel-containing byproduct, and wherein said naturally occurring component which detracts from the quality of the juice supply is hesperitin which, after said passing of the fruit juice supply through the adsorption resin, is at a level of not greater than about 10 ppm of the enhanced fruit juice supply.

45. The process of claim 1 wherein said cloudy juice product is a cloudy filler juice.

46. The process of claim 1 wherein said cloudy juice product is a cloudy stand-alone juice.

47. The process of claim 1 wherein said adsorption resin is a styrene divinylbenzene resin.

48. The process of claim 1 wherein the at least one naturally occurring component which detracts from the quality of the fruit juice supply is selected from the group consisting of naringin, limonin, hesperidin, polyphenol, para-vinylguaiacol, narirutin, sinensitin, nobiletin, heptamethoxyflavone, tangeritin, neohesperidine, naringenin and combinations thereof.

49. A process for providing a fruit juice supply, comprising:
providing a fruit juice supply, the fruit juice supply having at least one naturally occurring component which detracts from the quality of the fruit juice supply;
passing the juice supply through an adsorption resin thereby removing from the juice supply a quantity of said naturally occurring component which detracts from the quality of the juice supply;
collecting the juice supply which has passed through the adsorption resin as an enhanced fruit juice supply; and
adding to said enhanced fruit juice supply an all-natural bland clouding agent byproduct obtained by diafiltering a retentate containing a large percentage of suspended solids obtained from separating a fruit juice supply.

50. The process in accordance with claim 49, wherein said juice supply is a peel juice prepared from byproducts of citrus juice extraction.

51. The process in accordance with claim 49, wherein said naturally occurring component which detracts from the quality of the juice supply is selected from the group consisting of a limonoid, a flavonoid, a carotenoid, and a polyphenolic compound.

52. An enhanced fruit juice prepared by a process comprising:
providing a fruit juice supply having suspended solids and at least one naturally occurring component which detracts from the quality of the fruit juice supply;
separating the fruit juice supply into a permeate juice liquid and a retentate containing a large percentage of the suspended solids of the fruit juice supply;

passing the permeate juice liquid through an adsorption resin thereby removing from the permeate juice liquid a quantity of said naturally occurring component which detracts from the quality of the juice supply;

passing the retentate through a diafiltration unit, wherein the diafiltration unit separates the retentate into a diafiltration permeate and an all-natural bland clouding agent byproduct;

combining the juice liquid which has passed through the adsorption resin with the clouding agent byproduct to form an enhanced fruit juice;

wherein said at least one naturally occurring component which detracts from the quality of the juice supply comprises hesperidin, which is at a level of not greater than about 70 ppm of the enhanced fruit juice; and wherein said at least one naturally occurring component which detracts from the quality of the juice supply further comprises a polyphenol, which after said passing of the fruit juice supply through the adsorption resin, gives a gas chromatograph spectrophotomeric reading at 325 nm of not greater than about 0.2 at 23° C. for the first bed volume of said resin after its complete regeneration.

53. The fruit juice in accordance with claim 52, wherein said juice supply is a peel juice prepared from byproducts of citrus juice extraction.

54. The fruit juice in accordance with of claim 52, wherein said adsorption resin is a styrene divinylbenzene resin.

55. The fruit juice in accordance with of claim 52, wherein said naturally occurring component which detracts from the quality of the juice supply further comprises a component selected from the group consisting of a limonoid, a flavonoid, a carotenoid, and a polyphenolic compound.

* * * * *